(12) United States Patent
Chadwick

(10) Patent No.: US 6,342,696 B1
(45) Date of Patent: Jan. 29, 2002

(54) OBJECT DETECTION METHOD AND APPARATUS EMPLOYING POLARIZED RADIATION

(75) Inventor: George G. Chadwick, Menlo Park, CA (US)

(73) Assignee: The MacAleese Companies, Inc., Albuquerque, NM (US)

( * ) Notice: Subject to any disclaimer, the term of this patent is extended or adjusted under 35 U.S.C. 154(b) by 0 days.

(21) Appl. No.: 09/318,196

(22) Filed: May 25, 1999

(51) Int. Cl.[7] ............................................... G01S 13/04
(52) U.S. Cl. ......................... 250/225; 342/27; 342/188
(58) Field of Search ................................. 250/225, 216, 250/559.09, 221, 222.1, 214 R; 342/22, 27, 28, 188; 109/6, 9

(56) References Cited

U.S. PATENT DOCUMENTS

| | | | |
|---|---|---|---|
| 3,500,395 A | 3/1970 | Foster et al. | 343/5 |
| 3,599,211 A | 8/1971 | Mardon | 343/100 |
| 3,669,038 A | 6/1972 | Watson | 109/12 |
| 3,707,672 A | 12/1972 | Miller et al. | 324/41 |
| 3,713,156 A | 1/1973 | Pothier | 343/17 |
| 3,911,435 A | 10/1975 | Mardon et al. | 343/100 ME |
| 3,924,546 A | 12/1975 | Pretini | 109/3 |
| 4,064,458 A | 12/1977 | De Loach, Jr. | 325/54 |
| 4,122,783 A | 10/1978 | Pretini | 109/3 |
| 4,341,165 A | 7/1982 | Calandritti et al. | 109/8 |
| 4,461,221 A | 7/1984 | Schandle et al. | 109/6 |
| 4,481,887 A | 11/1984 | Urbano | 109/3 |
| 4,586,441 A | 5/1986 | Zekich | 109/8 |
| 4,656,954 A | 4/1987 | Tonali | 109/6 |
| 4,675,677 A | 6/1987 | Von Maydell et al. | 342/25 |
| 4,706,031 A | 11/1987 | Michiguchi et al. | |
| 4,905,008 A | 2/1990 | Kawano et al. | 342/22 |
| 4,951,058 A | 8/1990 | Schriner et al. | 342/61 |
| 5,039,981 A | 8/1991 | Rodriguez | 340/551 |
| 5,073,782 A | 12/1991 | Huguein et al. | 342/179 |
| 5,081,456 A | 1/1992 | Michiguchi et al. | 342/22 |
| 5,195,448 A | 3/1993 | Sims | 109/6 |
| 5,222,155 A | 6/1993 | Delanoy et al. | 382/30 |
| 5,227,800 A | 7/1993 | Huguenin et al. | 342/179 |
| 5,311,166 A | 5/1994 | Frye | 340/541 |

(List continued on next page.)

FOREIGN PATENT DOCUMENTS

| | | |
|---|---|---|
| JP | 09304517 | 11/1997 |
| WO | WO 96/19737 | 6/1996 |
| WO | WO 97/01771 | 1/1997 |

OTHER PUBLICATIONS

Abbott, G.F. "Personal Serveillance System" IBM Tech. Discl. Bulletin, vol. 12, No. 7, Dec., 1969, pp. 1119–1120.

Bhanu, B. "Guest Editorial: Introduction on the Special Issue on Automatic Target Detection and Recognition" IEEE Transactions on Image Processing, vol. 6, No. 1, Jan., 1997. pp. 1–6.

(List continued on next page.)

Primary Examiner—Stephone B. Allen
Assistant Examiner—Kevin Pyo
(74) Attorney, Agent, or Firm—Deborah A. Peacock; Jeffrey D. Myers; Andrea L. Mays

(57) ABSTRACT

Methods and apparatus for detecting objects are disclosed. In one embodiment of the invention, a person entering a secured or "Safe Zone™" is illuminated with low-power polarized radio waves. Differently polarized waves which are reflected back from the person are collected and measured. Persons carrying a concealed weapon such as a handgun are detected by calculating the difference of a pair of differences between levels of different polarized reflected energy. Alternative embodiments of the invention may be used to detect a wide variety of objects other than concealed firearms. The invention may be used for inventory control or to thwart shoplifting.

9 Claims, 28 Drawing Sheets

U.S. PATENT DOCUMENTS

| | | | |
|---|---|---|---|
| 5,334,981 A | 8/1994 | Smith et al. | 342/27 |
| 5,337,053 A | 8/1994 | Dwyer | 342/90 |
| 5,345,240 A | 9/1994 | Frazier | 342/28 |
| 5,365,237 A | 11/1994 | Johnson et al. | 342/179 |
| 5,381,153 A | 1/1995 | Saito et al. | 342/70 |
| 5,408,414 A | 4/1995 | Nomoto et al. | 364/449 |
| 5,446,461 A | 8/1995 | Frazier | 342/22 |
| 5,455,590 A | 10/1995 | Collins et al. | 342/179 |
| 5,457,394 A | 10/1995 | McEwan | 324/642 |
| 5,512,834 A | 4/1996 | McEwan | 342/642 |
| 5,517,429 A | 5/1996 | Harrison | 364/516 |
| 5,519,400 A | 5/1996 | McEwan | 342/28 |
| 5,552,705 A | 9/1996 | Keller | 324/239 |
| 5,552,766 A | 9/1996 | Lee et al. | 340/541 |
| 5,557,283 A | 9/1996 | Sheen et al. | 342/179 |
| 5,576,972 A | 11/1996 | Harrison | 364/516 |
| 5,598,152 A | 1/1997 | Scarzello et al. | 340/850 |
| 5,644,314 A | 7/1997 | Ahmad et al. | 342/22 |
| 5,673,050 A | 9/1997 | Moussally et al. | 342/22 |
| 5,692,446 A | 12/1997 | Becker et al. | 109/3 |
| 5,694,498 A | 12/1997 | Manasson et al. | 385/15 |
| 5,694,867 A | 12/1997 | Diaz-Lopez | 109/6 |
| 5,706,402 A | 1/1998 | Bell | 395/23 |
| 5,774,357 A | 6/1998 | Hoffberg et al. | 364/188 |

OTHER PUBLICATIONS

McMakin, D.L. et al. "Remote Concealed Weapons and Explosive Detection on People Using Millimeter–wave Holography" 1996 IEEE. pp. 19–25.

McMillan, R.W. et al. "Concealed Weapon Detection Using Microwave and Millimeter Wave Sensors" 1998 IEEE. pp. 1–4.

Murray, N.C. et al. "Exploitation of X–Ray Technology for the Detection of Contraband—Aviation Security Applications" European Conf. on Sec. and Detection Apr. 28–30, 1997, Conf. Publ. No. 437. pp. 13–18.

Reber, E.E. et al. "Final Report: Evaluation of Active and Passive Near–Millimeter–Wave Radiometric Imaging Techniques for Detection of Concealed Objects" Aerospace Report No. ATR–80(7843)–2, Mar. 20, 1981. pp. 1–29.

Varshney, P.K. et al. "On the Modeling of the Sensor Fusion Process for Concealed Weapons Detection" 1998 IEEE. p. 14.

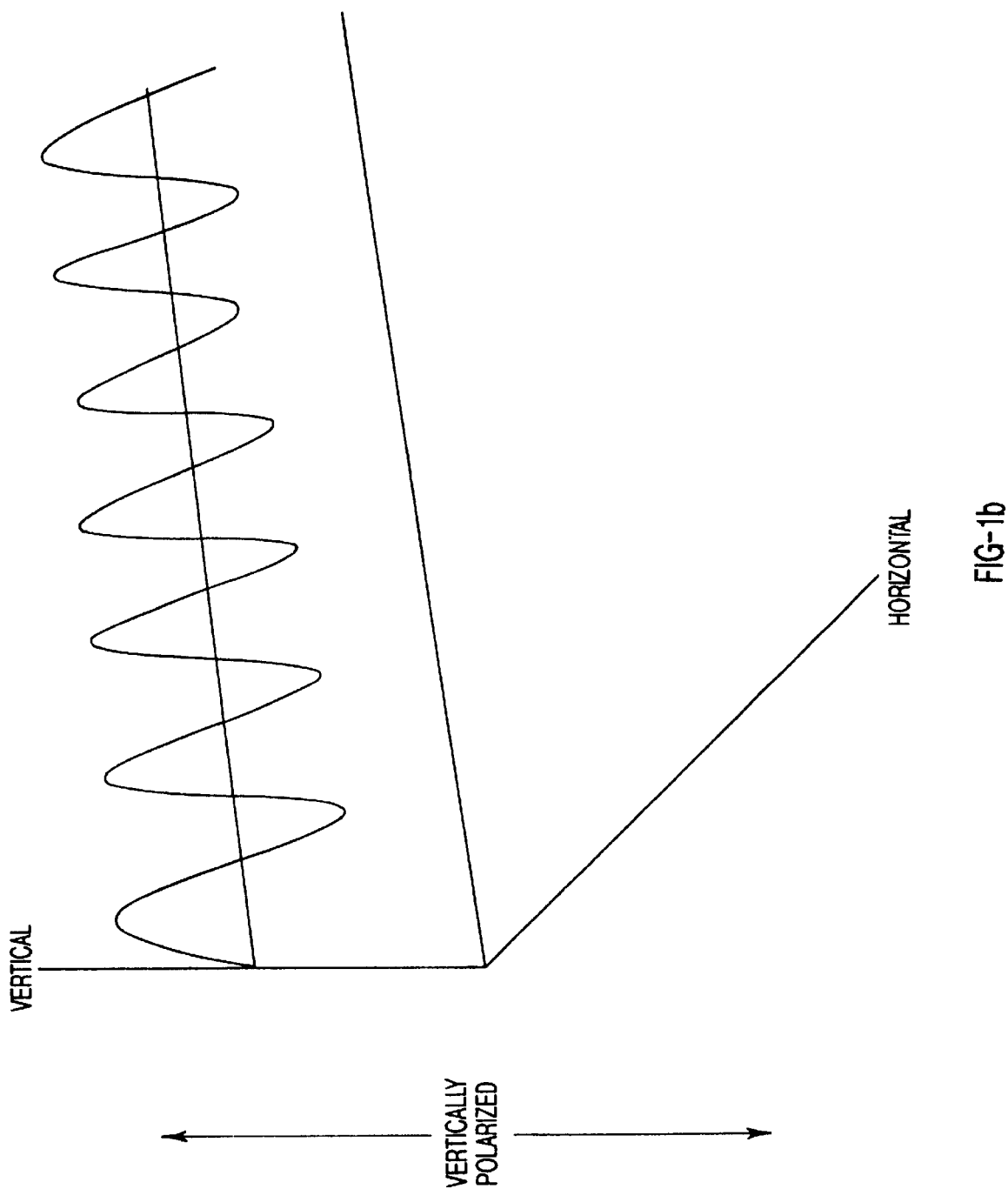

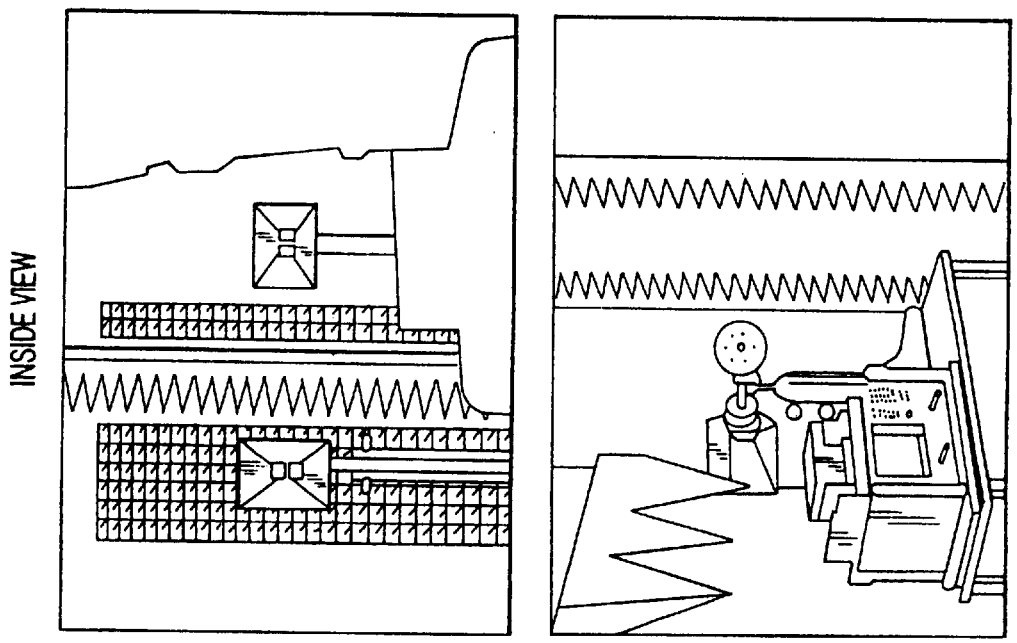
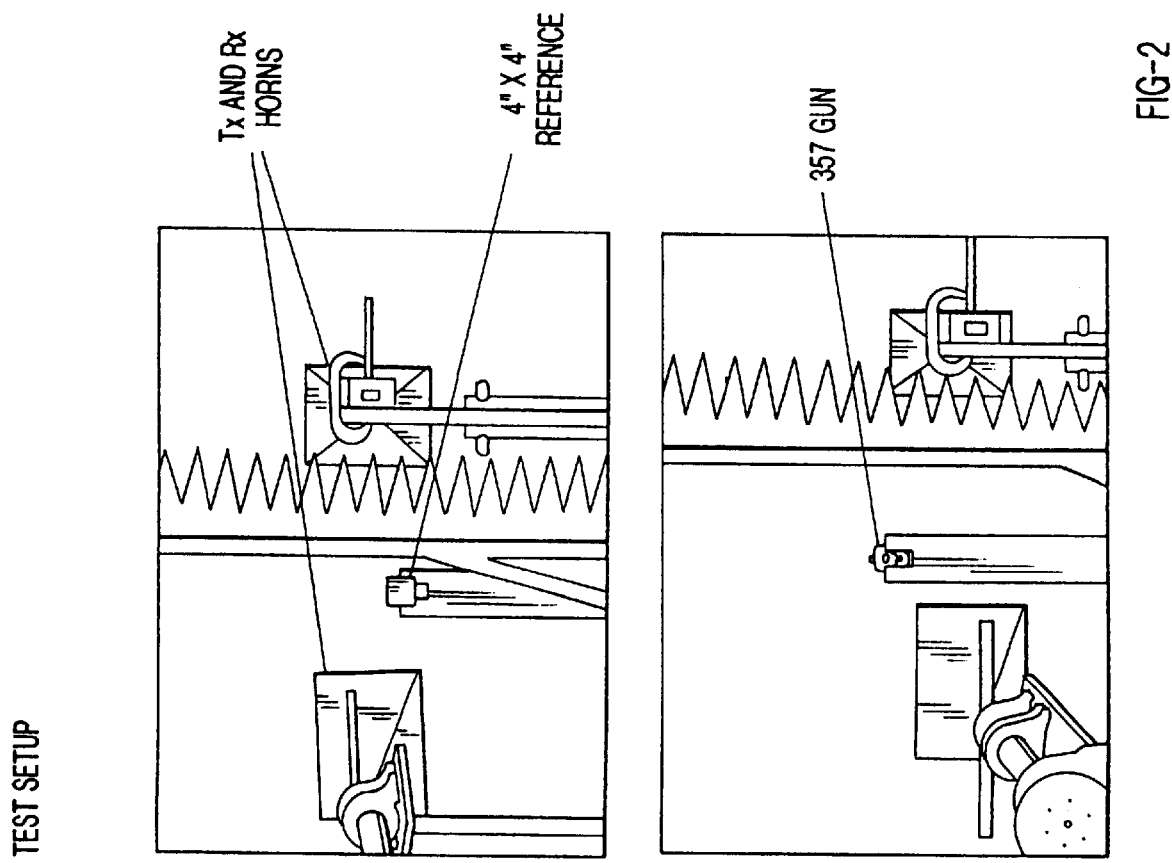
FIG-2

WHAT IS dBsm?

- IF THE GAIN IS 1 OR 0 dB
  - 1" X 1" = −31.9 dBsm
  - 3" X 3" = −22.4 dBsm
  - 6" X 6" = −16.4 dBsm
- AT 1 GHz FOR A 6" X 6" PLATE, THE GAIN IS 5.1 dB
- 6" X 6" PLATE AT 1 GHz = −16.4 + 5.1 = −11.3 dB
- FOR FLAT SURFACES THE GAIN INCREASES AS 20 LOG (f) WHERE f IS IN GHz AND THE RESULT IS IN dB

FIG-5

357 REFERENCE RCS MEASUREMENTS

- 357 RADAR CROSS SECTION MEASURED
  - 500 − 1000 MHz           −15 dBsm
  - 1000 − 1750 MHz
  - 2650 − 3000 MHz          −10 dBsm
  - 2890 − 3250 MHz
  - 9500 − 10660 MHz
- TEST CONFIGURATION
  - ONE PORT RCS MEASUREMENT
  - 16 AVERAGES
  - TIME DOMAIN GATING
  - REDUCED IF BANDWIDTH

FIG-6

9.5 TO 10.6 GHz

- TWO TEST SUBJECTS USED
  - GEORGE CHADWICK
  - CRAIG WEAKLEY
- TRANSMIT VERTICAL, RECEIVE HORIZONTAL ONLY (NO CO-POLE IN THIS SET)

|  | FRONT | SIDE | BACK |
|---|---|---|---|
| GEORGE | -3.5 dB | 12 dB | 13 dB |
| CRAIG | 8 dB | 5 dB | 4 dB |

- 5 OUT OF 6 CASES WERE POSITIVE. BEST RESULTS TO DATE

NOTE:
- NUMBERS GIVEN ARE DELTAS BETWEEN CROSS-POLE LEVELS, (GUN LEVEL/NO GUN LEVEL)
- POSITIVE MEANS GUN IS GREATER

FIG-11

2.9 TO 3.25 GHz

DATA SUMARY--5 MAY/99 DATA--2.9 TO 3.25 GHz

ALL FIGURES IN dB; HORIZONTAL Tx FOR ALL CASES;

FRONT

| | MAIN/NO GUN | X/NO GUN | MAIN-GUN: | X GUN | NO GUN D | GUN D | MARGIN | MARGIN AVG | MAIN D |
|---|---|---|---|---|---|---|---|---|---|
| KEVIN | -41.0 | -70.6 | -49.7 | -57.6 | 29.6 | 7.9 | 21.7 | 15.2 | 8.7 |
| ROKKI | -51.0 | -66.5 | -45.7 | -64.0 | 15.5 | 18.3 | -2.8 | 4.8 | -5.3 |
| CRAIG | -41.4 | -70.6 | -39.8 | -64.1 | 29.2 | 24.3 | 4.9 | -1.3 | -1.6 |
| GEORGE | -51.0 | -68.9 | -55.7 | -54.9 | 17.9 | -0.8 | 18.7 | 23.9 | 4.7 |
| | | | | AVERAGE | 23.1 | | | | |

SIDE

| | MAIN/NO GUN | X/NO GUN | MAIN-GUN: | X GUN | NO GUN D | GUN D | MARGIN | MARGIN AVG | MAIN D |
|---|---|---|---|---|---|---|---|---|---|
| KEVIN | -43.6 | -68.4 | -48.1 | -64.8 | 24.8 | 16.7 | 8.1 | 7.8 | 4.5 |
| ROKKI | -44.7 | -76.6 | -52.0 | -68.0 | 31.9 | 16.0 | 15.9 | 8.5 | 7.3 |
| CRAIG | -53.4 | -68.1 | -60.5 | -63.7 | 14.7 | 3.2 | 11.5 | 21.3 | 7.1 |
| GEORGE | -41.3 | -67.7 | -38.9 | -52.8 | 26.4 | 13.9 | 12.5 | 10.6 | -2.4 |
| | | | | AVERAGE | 24.5 | | | | |

BACK

| | MAIN/NO GUN | X/NO GUN | MAIN-GUN: | X GUN | NO GUN D | GUN D | MARGIN | MARGIN AVG | MAIN D |
|---|---|---|---|---|---|---|---|---|---|
| KEVIN | -42.0 | -61.1 | -45.0 | -63.8 | 19.1 | 18.8 | 0.3 | 6.0 | 3.0 |
| ROKKI | -36.3 | -79.9 | -46.7 | -57.4 | 43.6 | 10.7 | 32.9 | 14.1 | 10.4 |
| CRAIG | -38.8 | -71.5 | -38.4 | -52.0 | 32.7 | 13.6 | 19.1 | 11.2 | -0.4 |
| GEORGE | -55.0 | -58.9 | -42.5 | -56.8 | 3.9 | 14.3 | -10.4 | 10.5 | -12.5 |
| | | | | AVERAGE | 24.8 | | | | |

FIG-12

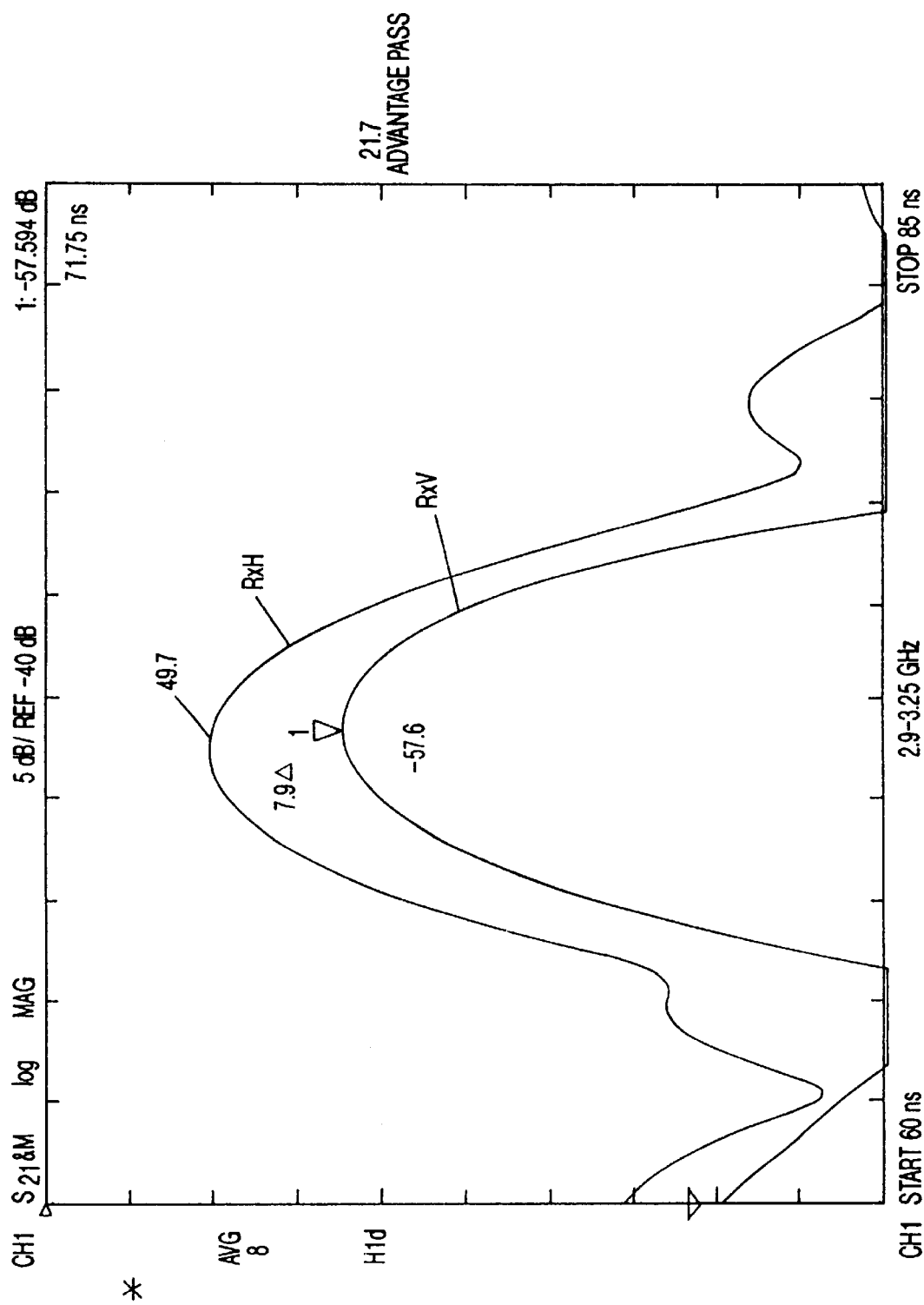

2.9 TO 3.25 GHz – SUMMARY FRONT CASES

| | FRONT | | | | | | | FALSE ALARM | | |
|---|---|---|---|---|---|---|---|---|---|---|
| | MAIN/NO GUN | X NO GUN | MAIN-GUN | X GUN | NO GUN D | GUN D | MARGIN | XG-XNGq AVE | XNG-XNG AVE | NGD-NGD AVE | NOTE # |
| ZOLT | -42.5 | -65.7 | -40.7 | -62.9 | 23.2 | 22.2 | 1.4 | 4.7 | 1.9 | 2.4 | 1 |
| ROKKI | -43.0 | -72.8 | -39.8 | -56.4 | 29.8 | 16.6 | 4.2 | 11.2 | -5.2 | 9.0 | 2 |
| ROKKI | -48.7 | -71.2 | -46.9 | -63.6 | 22.5 | 16.7 | 4.1 | 4.0 | -3.6 | 1.7 | 2 |
| ROKKI | -50.7 | -72.0 | -49.1 | -59.0 | 21.3 | 9.9 | 10.9 | 8.6 | -4.4 | 0.5 | 2 |
| ROKKI | -43.2 | -67.1 | -49.1 | -59.0 | 23.9 | 9.9 | 10.9 | 8.6 | 0.5 | 3.1 | 3 |
| ROKKI | -40.1 | -72.4 | -39.4 | -64.7 | 32.3 | 25.3 | -4.5 | 2.9 | -4.8 | 11.5 | 4 |
| ROKKI | -43.3 | -65.1 | -45.3 | -67.3 | 21.8 | 22.0 | -1.2 | 0.3 | 2.5 | 1.0 | 5 |
| ROKKI | -46.6 | -73.0 | -41.3 | -62.0 | 26.4 | 20.7 | 0.1 | 5.6 | -5.4 | 5.6 | 2 |
| ZOLT | -41.5 | -58.0 | -41.9 | -64.8 | 16.5 | 22.9 | -2.1 | 2.8 | 9.6 | -4.3 | 8 |
| DEAN | -39.3 | -58.4 | -42.4 | -58.0 | 19.1 | 15.6 | 5.2 | 9.6 | 9.2 | -1.7 | 6 |
| ROKKI | -50.6 | -53.3 | -48.7 | -52.5 | 3.2 | 3.8 | 17.0 | 15.1 | 13.8 | -17.6 | 7 |
| AVERAGES | -45.0 | -67.6 | -44.5 | -61.8 | 20.8 | 16.0 | | | | | |
| | | | | | | | RULE A | TEST B | TEST C | |

MAIN POLARIZATIONS ARE ABOUT THE SAME LEVEL - WITHIN 0.5 dB ON THE AVERAGE
GUN X POLARIZATION IS ABOUT 6 dB HIGHER THAN THE NO GUN CROSS - ON THE AVERAGE.
GUN DIFFERENCE IS ABOUT 5 dB HIGHER THAN THE NO GUN DIFFERENCE - ON THE AVERAGE.
RULE A GIVES 100% DETECTION.
TESTS B AND C GIVE A 3/11 OR 27% FALSE ALARM RATE.

1 ZOLT            MALE      5'11"         180 lbs
2 ROKKI           FEMALE    5'6"          145 lbs
3 KEYS AND CELL NEXTEL PHONE IN EACH POCKET
4 LEATHER JACKET - NO ZIPPER
5 SPORTS COAT - NO SIDE UNIT
6 DEAN            MALE      6'1"          220 lbs
7 LEATHER JACKET WITH ZIPPER - CAUGHT BY SIDE UNIT
8 CAUGHT BY SIDE UNIT

NULLED
NULLED

IF RULE A IS POSITIVE, THEN WE HAVE GUN.
IF TEST B AND C ARE BOTH POSITIVE WE HAVE A FALSE ALARM.

FIG-15

2.9 TO 3.25 GHz - SUMMARY SIDE CASES

| | SIDE | | | | | | | FALSE ALARM | | |
|---|---|---|---|---|---|---|---|---|---|---|
| | MAIN/NO GUN | X NO GUN | MAIN-GUN | X GUN | NO GUN D | GUN D | MARGIN | XG-XNG GAVE | XNG-XNG AVE | NGD-NGD AVE | NOTE # |
| ZOLT | -39.0 | -56.4 | -46.7 | -55.1 | 17.4 | 8.4 | 14.6 | 12.5 | 11.2 | -5.6 | 1 |
| ROKKI | -44.3 | -67.9 | -40.3 | -66.9 | 23.6 | 26.6 | -3.6 | 0.7 | -0.3 | 0.6 | 2 |
| ROKKI | -45.1 | -65.9 | -39.9 | -63.1 | 20.8 | 23.2 | -0.2 | 4.5 | 1.7 | -2.2 | 2 |
| ROKKI | -43.2 | -75.1 | -49.7 | -66.7 | 31.9 | 17.0 | 6.0 | 0.9 | -7.5 | 8.9 | 2 |
| ROKKI | -42.0 | -74.8 | -49.7 | -66.7 | 32.8 | 17.0 | 6.0 | 0.9 | -7.2 | 9.8 | 3 |
| ROKKI | -44.5 | -75.6 | -43.4 | -68.1 | 31.1 | 24.7 | -1.7 | -0.5 | -8.0 | 8.1 | 4 |
| ROKKI | -44.7 | -74.7 | -43.7 | -60.5 | 30.0 | 16.8 | 6.2 | 7.1 | -7.1 | 7.0 | 5 |
| ROKKI | -42.2 | -62.0 | -54.0 | -60.0 | 19.8 | 6.0 | 17.0 | 7.6 | 5.6 | -3.2 | 2 |
| ZOLT | -45.1 | -65.9 | -30.9 | -63.1 | 20.8 | 32.2 | -9.2 | 4.5 | 1.7 | -2.2 | 8 |
| DEAN | -40.0 | -57.9 | -40.5 | -56.6 | 17.9 | 16.1 | 6.9 | 11.0 | 9.7 | -5.1 | 6 |
| ROKKI | -38.7 | -55.0 | -45.0 | -53.0 | 16.3 | 8.0 | 15.0 | 14.6 | 12.6 | -6.7 | 7 |
| AVERAGES | -43.0 | -67.6 | -45.3 | -62.7 | 23.0 | 16.4 | | RULE A | TEST B | TEST C | |

NOTES

MAIN POLARIZATIONS ARE ABOUT THE SAME LEVEL—WITHIN 2.3 dB ON THE AVERAGE.
GUN X POLARIZATION IS ABOUT 5 dB HIGHER THAN THE NO GUN CROSS—ON THE AVERAGE.
GUN DIFFERENCE IS ABOUT 6.6 dB HIGHER THAN THE NO GUN DIFFERENCE—ON THE AVERAGE.
RULE A GIVES 100% DETECTION.
TESTS B AND C GIVE NO FALSE ALARM RATE.

| | | | |
|---|---|---|---|
| 1 ZOLT | MALE | 5' 11" | 180 lbs |
| 2 ROKKI | FEMALE | 5' 6" | 145 lbs |
| 3 KEYS AND CELL NEXTEL PHONE IN EACH POCKET | | | |
| 4 LEATHER JACKET–NO ZIPPER | | | |
| 5 SPORTS COAT–NO SIDE UNIT | | | |
| 6 DEAN | MALE | 6' 1" | 220 lbs |
| 7 LEATHER JACKET WITH ZIPPER–CAUGHT BY SIDE UNIT | | | NULLED |
| 8 CAUGHT BY SIDE UNIT | | | NULLED |

IF RULE A IS GREATER THAN -1 dB, THEN WE HAVE A GUN.
IF TEST B AND C ARE BOTH POSITIVE WE HAVE A FALSE ALARM.

FIG-16

2.9 TO 3.25 GHz - SUMMARY BACK CASES

| | BACK | | | | | | FALSE ALARM | | |
|---|---|---|---|---|---|---|---|---|---|
| | MAIN/NO GUN | X NO GUN | MAIN-GUN | X GUN | NO GUN D | GUN D | MARGIN | XG-XNG GAVE | XNG-XNG AVE | NGD-NGD AVE | NOTE # |
| ZOLT | -45.5 | -69.1 | -46.9 | -60.6 | 23.6 | 13.7 | 12.1 | 0.7 | -7.8 | -2.2 | 1 |
| ROKKI | -37.9 | -63.8 | -43.4 | -57.9 | 25.9 | 14.5 | 11.3 | 3.4 | -2.5 | 0.1 | 2 |
| ROKKI | -35.4 | -66.4 | -47.2 | -60.8 | 31.0 | 13.6 | 12.2 | 0.5 | -5.1 | 5.2 | 2 |
| ROKKI | -35.6 | -70.6 | -43.2 | -60.3 | 35.0 | 17.1 | 8.7 | 1.0 | -9.3 | 9.2 | 2 |
| ROKKI | -36.8 | -69.1 | -43.2 | -60.3 | 32.3 | 17.1 | 8.7 | 1.0 | -7.8 | 6.5 | 9 |
| ROKKI | -35.1 | -65.5 | -36.5 | -66.9 | 30.4 | 30.4 | -4.6 | -5.6 | -4.2 | 4.6 | 4 |
| ROKKI | -38.5 | -68.0 | -42.5 | -61.0 | 29.5 | 18.5 | 7.3 | 0.3 | -6.7 | 3.7 | 5 |
| ROKKI | -35.0 | -64.0 | -47.0 | -53.6 | 29.0 | 6.6 | 19.2 | 7.7 | -2.7 | 3.2 | 1 |
| ZOLT | -39.0 | -65.0 | -43.3 | -61.6 | 26.0 | 18.3 | 7.5 | -0.3 | -3.7 | 0.2 | 8 |
| DEAN | -35.0 | -57.3 | -33.5 | -56.8 | 22.3 | 23.3 | 2.5 | 4.5 | 4.0 | -3.5 | 6 |
| ROKKI | -38.9 | -72.9 | -44.7 | -52.8 | 34.0 | 8.1 | 17.7 | 8.5 | -11.6 | 8.2 | 7 |
| AVERAGES | -37.8 | -61.3 | -43.8 | -60.0 | 25.8 | 13.7 | | RULE A | TEST B | TEST C | |

MAIN POLARIZATIONS ARE WITHIN 6 dB ON THE AVERAGE.
GUN X POLARIZATION IS ABOUT 8 dB HIGHER THAN THE NO GUN CROSS—ON THE AVERAGE.
GUN DIFFERENCE IS ABOUT 13.2 dB HIGHER THAN THE NO GUN DIFFERENCE—ON THE AVERAGE.
RULE A GIVES 91% DETECTION.
TESTS B AND C GIVE NO FALSE ALARM RATE.

1 ZOLT      MALE    5' 11"    180 lbs    NULLED
2 ROKKI     FEMALE  5' 6"     145 lbs    NULLED
9 KEYS IN FRONT POCKET AND NEXTEL PHONE IN BACK POCKET
4 LEATHER JACKET-NO ZIPPER
5 SPORTS COAT-NO SIDE UNIT
6 DEAN
7 LEATHER JACKET WITH ZIPPER-CAUGHT BY SIDE UNIT
8 CAUGHT BY SIDE UNIT IF RULE A IS GREATER THAN -1 dB, THEN WE HAVE A GUN.
IF TEST B AND C ARE BOTH POSITIVE WE HAVE A FALSE ALARM.

FIG-17

9.5 – 10.6 GHz SUMMARY FRONT CASES

| | FRONT | | | | | | | FALSE ALARM | | |
|---|---|---|---|---|---|---|---|---|---|---|
| | MAIN/NO GUN | X NO GUN | MAIN-GUN | X GUN | NO GUN D | GUN D | MARGIN | XG-XNGg AVE | XNG-XNG AVE | NGD-NGD AVE | NOTE# |
| ROKKI | -62.5 | -81.7 | -67.1 | -82.7 | 19.2 | 15.6 | 4.2 | 3.2 | 4.2 | -0.6 | 1 |
| DEAN | -59.1 | -76.1 | -61.9 | -84.0 | 17.0 | 21.1 | -2.3 | 1.9 | 9.8 | -2.9 | 2 |
| ROKKI | -67.4 | -93.0 | -65.5 | -82.2 | 25.6 | 16.7 | 3.1 | 3.7 | -7.1 | 5.8 | 1 |
| ROKKI | -64.9 | -85.0 | -68.4 | -77.7 | 20.1 | 9.3 | 10.6 | 8.2 | 0.9 | 0.3 | 3 |
| GEORGE | -72.9 | -96.3 | -73.8 | -83.9 | 23.4 | 10.1 | 9.7 | 2.0 | -10.4 | 3.6 | |
| CHET | -69.5 | -83.3 | -70.2 | -76.4 | 13.8 | 6.2 | 13.7 | 9.5 | 2.6 | -6.1 | 4 |
| AVERAGES | -66.1 | -85.9 | -67.8 | -81.2 | 19.9 | 13.3 | | | | | |

MAIN POLARIZATIONS ARE ABOUT THE SAME LEVEL-WITHIN 1.7 dB ON THE AVERAGE.
GUN X POLARIZATION IS ABOUT 4.7 dB HIGHER THAN THE NO GUN CROSS-ON THE AVERAGE.
GUN DIFFERENCE IS ABOUT 6.6 dB HIGHER THAN THE NO GUN DIFFERENCE-ON THE AVERAGE.
RULE A GIVES 100% DETECTION.
TESTS B AND C GAVE NO FALSE ALARM RATE.

| | RULE A | TEST B | TEST C |

DEAN          MALE                              6'1"    220 lbs
ROKKI WITH METAL RIMMED GLASSES
CHET          MALE                              6'0"    185 lbs
*CHET HAD GLASSES ON, GLASSES, MULTIPLE KEYS
 AND A SMALL POCKET KNIFE IN POCKETS.

IF RULE A IS GREATER THAN 0 dB, THEN WE HAVE A GUN.
IF TEST B AND C ARE BOTH POSITIVE AND GREATER THAN 1 dB WE HAVE A FALSE ALARM.

FIG-18

PARAMETERS FOR 3.075 GHz

ARRAY TEST MODEL 4X4 ARRAY

INPUTS

| | |
|---|---|
| FREQUENCY (GHz) | 3.075 |
| THETA START (deg) | 0 |
| THETA STEP (deg) | 0.5 |
| SPACING, S(") | 2.84 |
| COEFFICIENT, p | 1.53 |
| EDGE ILLUMINATION (dB) | -10 |
| SCAN ANGLE (deg) | 0 |
| MAX PHASE ERROR (Deg) | 0.00 |
| MAX AMPLITUDE ERROR (+,-dB) | 0 |
| NO. OF ELEMENTS | 4 |
| SWR | 2 |
| INSERTION LOSS (dB) | 1.5 |
| RANGE (ft) | 20 |

OUTPUTS

| | | |
|---|---|---|
| C | 0.316 | |
| WAVELENGTH (") =1 | 3.837 | |
| $\pi * Z/\lambda$ | 2.325 | |
| RATIO | 1.000 | |
| MIN ERROR (V) | 1.000 | |
| MAX ERROR | 1.000 | |
| $\sigma =$ | 0.000 | |
| PHASE RMS (deg) | 0.000 | |
| AMP RMS (dB) + F36 | 0.000 | |
| Rho | 0.333 | |
| SWR LOSS (dB) | 0.51 | |
| SIZE | 11.36 | |
| An=C+(1-C) Cos((2n-1)/64*@pi)^p | | |
| 3dB BW | | 32.8 DEGREES |
| 1st SL | | 23.8 dB |
| GAIN | | 17.4 dBi |
| FAR FIELD | | 5.6 Ft |
| 3 dB SPOT | | 11.8 Ft Dia |
| 17.5 dB BW SHOULD BE LESS THAN 20 DEGREES | | |

ARRAY TEST MODEL 8X8 ARRAY

INPUTS

| | |
|---|---|
| FREQUENCY (GHz) | 3.075 |
| THETA START (deg) | 0.000 |
| THETA STEP (deg) | 0.100 |
| SPACING, s(") | 2.840 |
| COEFFICIENT, p | 1.000 |
| EDGE ILLUMINATION (dB) | -8.000 |
| SCAN ANGLE (deg) | 0.000 |
| MAX PHASE ERROR (Deg) | 0.000 |
| MAX AMPLITUDE ERROR (+,-dB) | 0.000 |
| NO. OF ELEMENTS | 8.000 |
| SWR | 2.000 |
| INSERTION LOSS (dB) | 1.500 |
| RANGE (ft) | 20.000 |

OUTPUTS

| | | |
|---|---|---|
| C | 0.398 | |
| WAVELENGTH (") =1 | 3.837 | |
| p*S/1 | 2.325 | |
| RATIO | 1.000 | |
| MIN ERROR (V) | 1.000 | |
| MAX ERROR | 1.000 | |
| s = | 0.000 | |
| PHASE RMS (deg) | 0.000 | |
| AMP RMS (dB) + F36 | 0.000 | |
| Rho | 0.333 | |
| SWR LOSS (dB) | 0.512 | |
| SIZE | 22.717 | |
| An=C+(1-C)Cos((2n-1)/64*@pi) ^ p | | |
| 3 dB BW | | 9.7 DEGREES |
| 1st SL | | 18.9 dB |
| GAIN | | 24.1 dBi |
| FAR FIELD | | 22.4 Ft |
| 3 dB SPOT | | 3.4 Ft Dia |
| 17.5 dB BW | | 20.0 DEGREES |
| 17.5 DEGREE BW SHOULD BE LESS THAN 20 DEGREES | | |

FIG-21

PARAMETERS FOR 10.05 GHz

ARRAY TEST MODEL 8 X 8 ARRAY

INPUTS

| | |
|---|---|
| FREQUENCY (GHz) | 10.05 |
| THETA START (deg) | 0 |
| THETA STEP (deg) | 0.5 |
| SPACING, s(") | 1.01 |
| COEFFICIENT, p | 1.53 |
| EDGE ILLUMINATION (dB) | -10 |
| SCAN ANGLE (deg) | 0 |
| MAX PHASE ERROR (Deg) | 0.00 |
| MAX AMPLITUDE ERROR (+, -dB) | 0 |
| NO OF ELEMENTS | 8 |
| SWR | 2 |
| INSERTION LOSS (dB) | 1 |
| RANGE (ft) | 20 |

OUTPUTS

| | |
|---|---|
| C | 0.316 |
| WAVELENGTH (") = 1 | 1.174 |
| $\pi * \Sigma/\lambda$ | 2.702 |
| RATIO | 1.000 |
| MIN ERROR (V) | 1.000 |
| MAX ERROR | 1.000 |
| $\sigma =$ | 0.000 |
| PHASE RMS (deg) | 0.000 |
| AMP RMS(dB) + F36 | 0.000 |
| Rho | 0.333 |
| SWR LOSS (dB) | 0.51 |
| SIZE | 8.08 |
| $An = C+(1-C) \cos((2n-1)/64 \cdot @pi)^p$ | |

| | |
|---|---|
| 3 dB BW | 8.9 DEGREES |
| 1st SL | 18.9 dB |
| GAIN | 24.2 dBi |
| FAR FIELD | 9.3 Ft |
| 3 dB SPOT | 3.1 Ft Dia |

ARRAY TEST MODEL 10 X 10 ARRAY

INPUTS

| | |
|---|---|
| FREQUENCY (HGz) | 10.05 |
| THETA START (deg) | 0.00 |
| THETA STEP (deg) | 0.50 |
| SPACING, s(") | 1.01 |
| COEFFICIENT, p | 1.53 |
| EDGE ILLUMINATION (dB) | -10.00 |
| SCAN ANGLE (deg) | 0.00 |
| MAX PHASE ERROR (deg) | 0.00 |
| MAX AMPLITUDE ERROR (+, -dB) | 0.00 |
| NO OF ELEMENTS | 8.00 |
| SWR | 2.00 |
| INSERTION LOSS (dB) | 1.50 |
| RANGE (ft) | 20.00 |

OUTPUTS

| | |
|---|---|
| C | 0.316 |
| WAVELENGTH (") = 1 | 1.174 |
| $p$'S/1 | 2.702 |
| RATIO | 1.000 |
| MIN ERROR(V) | 1.000 |
| MAX ERROR | 1.000 |
| $s =$ | 0.000 |
| PHASE RMS(deg) | 0.000 |
| AMP RMS(dB) + F36 | 0.000 |
| Rho | 0.333 |
| SWR LOSS (dB) | 0.512 |
| SIZE | 10.098 |
| $An = C+(1-C) \cos((2n-1)/64 \cdot @pi)^p$ | |

| | |
|---|---|
| 3 dB BW | 7.100 DEGREES |
| 1st SL | 24.000 dB |
| GAIN | 26.017 dBi |
| FAR FIELD | 14.473 Ft |
| 3 dB SPOT | 2.482 Ft Dia |

FIG-22

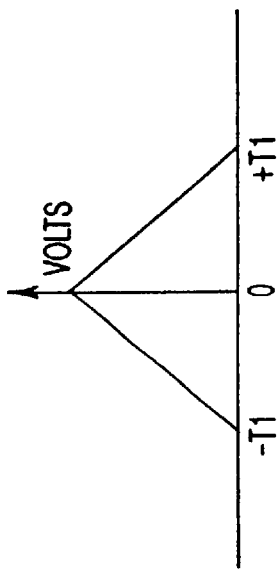
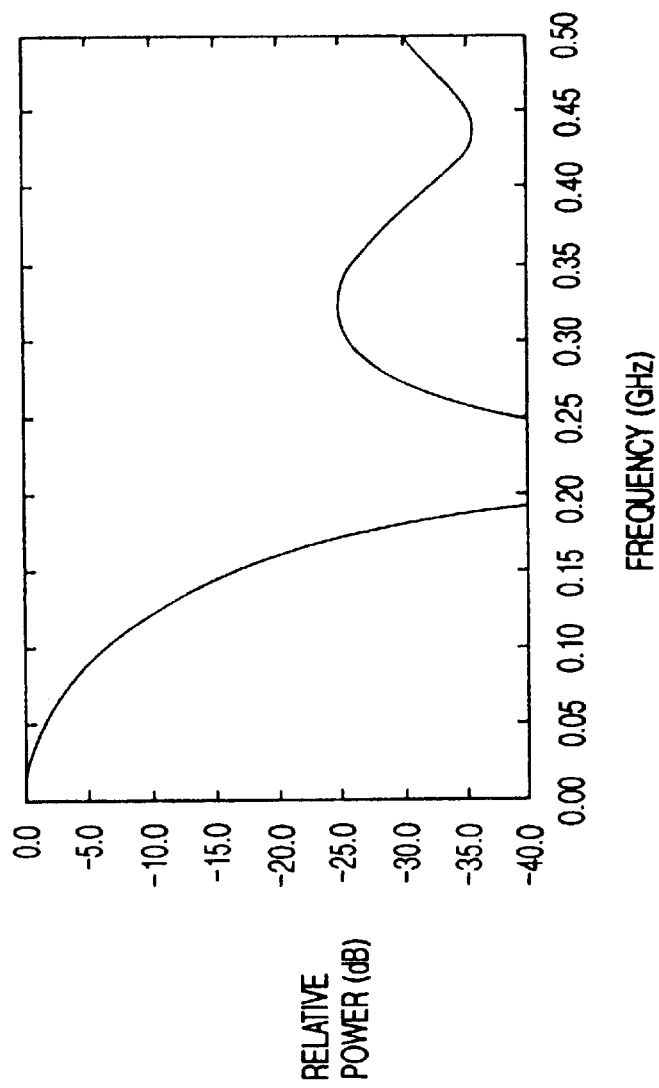
FIG-23

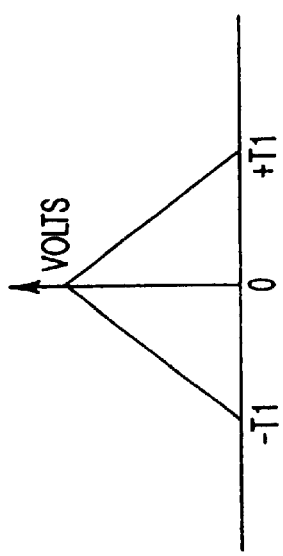
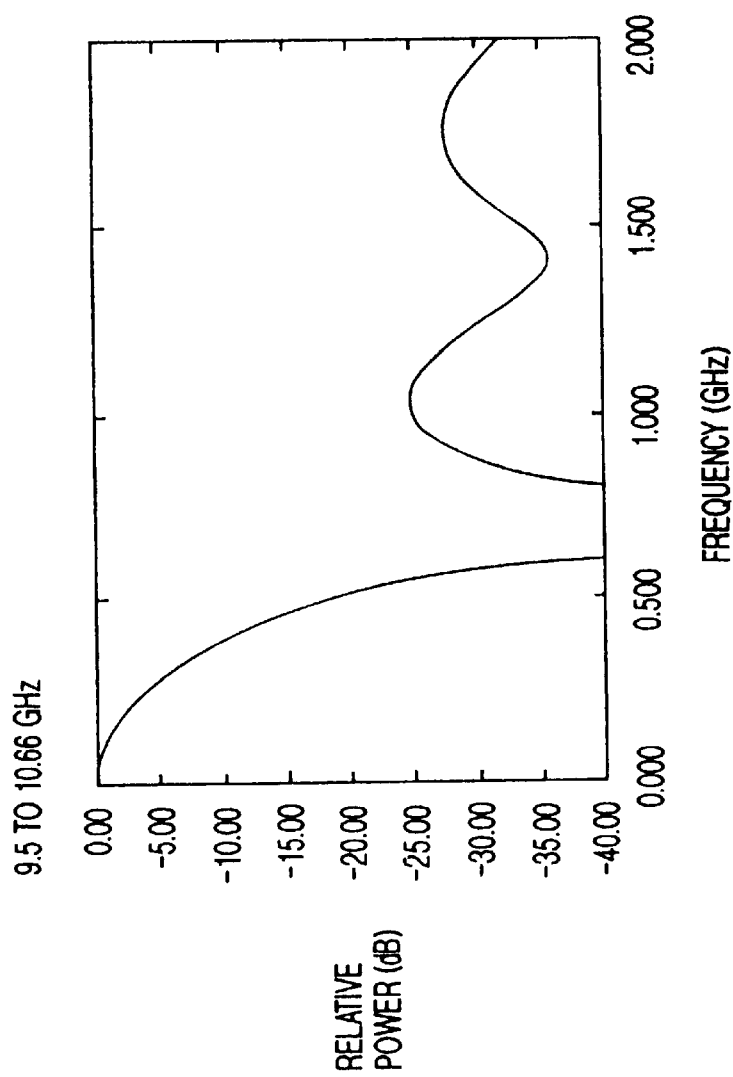
FIG-24

OBJECT DETECTION METHOD AND APPARATUS EMPLOYING POLARIZED RADIATION

FEDERALLY SPONSORED RESEARCH OR DEVELOPMENT

None.

FIELD OF THE INVENTION

The present invention is a system for remotely detecting the presence of an object. More particularly, one preferred embodiment of the invention supplies methods and apparatus for sensing concealed weapons to create a "Safe Zone™."

BACKGROUND OF THE INVENTION

On Apr. 20 1999, two students at the Columbine High School in Littelton, Colo. opened fire on their classmates and teachers with assault weapons. Twelve teenagers and one teacher were killed, and dozens of others were wounded. Tragic acts of violence like the Littleton massacre occur all too often in present day America. The Federal Bureau of Investigation reports that every year, criminals in the United States use firearms to commit over 2.4 million robberies, 5.6 million assaults, and 165,000 rapes. (See *American Firearms Industry Journal*, published by the National Association of Federally Licensed Firearms Dealers, www.amfire.com.) The Center for Disease Control has collected data showing that 247,979 "firearm deaths" were recorded in the United States during the years 1986–1992. (Data compiled by the Center to Prevent Handgun Violence, www.handguncontrol.org.)

Many previous efforts to reduce the threat posed by the criminal use of firearms have met with limited success. In the past two decades, very expensive x-ray equipment has been installed in major airports. The machines are generally capable of detecting a metal gun in a very specialized, closed environment. This type of equipment requires a fixed installation, occupies a very large space, is close-range and may cost hundreds of thousands or even millions of dollars.

None of the complex concealed weapon detectors that are currently available in the commercial market are compact, lightweight, portable, easy to use, long-range and highly reliable. The development of such a device would constitute a revolutionary achievement and would satisfy a long felt need in the fields of law enforcement and security.

SUMMARY OF THE INVENTION

The Object Detection System comprises methods and apparatus for detecting the presence of an object at a distance. One embodiment of the invention may be used to locate a concealed firearm carried by a person. The invention may be used to help keep weapons out of any secure area or "Safe Zone™," such as a school, bank, airport, embassy, prison, courtroom, office building, retail store or residence. The term "Safe Zone™" is a Trade and Service Mark owned by the Assignee of the present Patent Application, The MacAleese Companies, doing business as Safe Zone™ Systems, Incorporated.

One embodiment of the invention utilizes low-power, horizontally polarized radio waves to illuminate a target, such as a person who may be entering a doorway. Radio waves reflected from the target are gathered by a receive antenna and then processed by a detector circuit. The presence of the concealed weapon is determined by solving an algorithm which utilizes measured differences in the amplitudes of waveforms that represent different polarized energy levels reflected back from the target, and which also utilizes stored waveforms which represent the expected responses of a person who is not carrying a weapon, as well as the responses of a person carrying a weapon.

One embodiment of the present invention offers the additional benefits of being compact, lightweight, long-range, portable and battery-operated. In another embodiment, invention may be incorporated into automatic door-opening equipment. In yet another alternative embodiment, the invention may be used to locate inexpensive tags attached to merchandise as an inventory control and anti-shoplifting system.

An appreciation of other aims and objectives of the present invention and a more complete and comprehensive understanding of this invention may be achieved by referring to the drawings, and by studying the description of preferred and alternative embodiments.

A BRIEF DESCRIPTION OF THE DRAWINGS

FIG. 1B illustrates a simple wave that is vertically polarized.

FIG. 2 offers pictorial views of test setups for one embodiment of the present invention.

Figure 3:
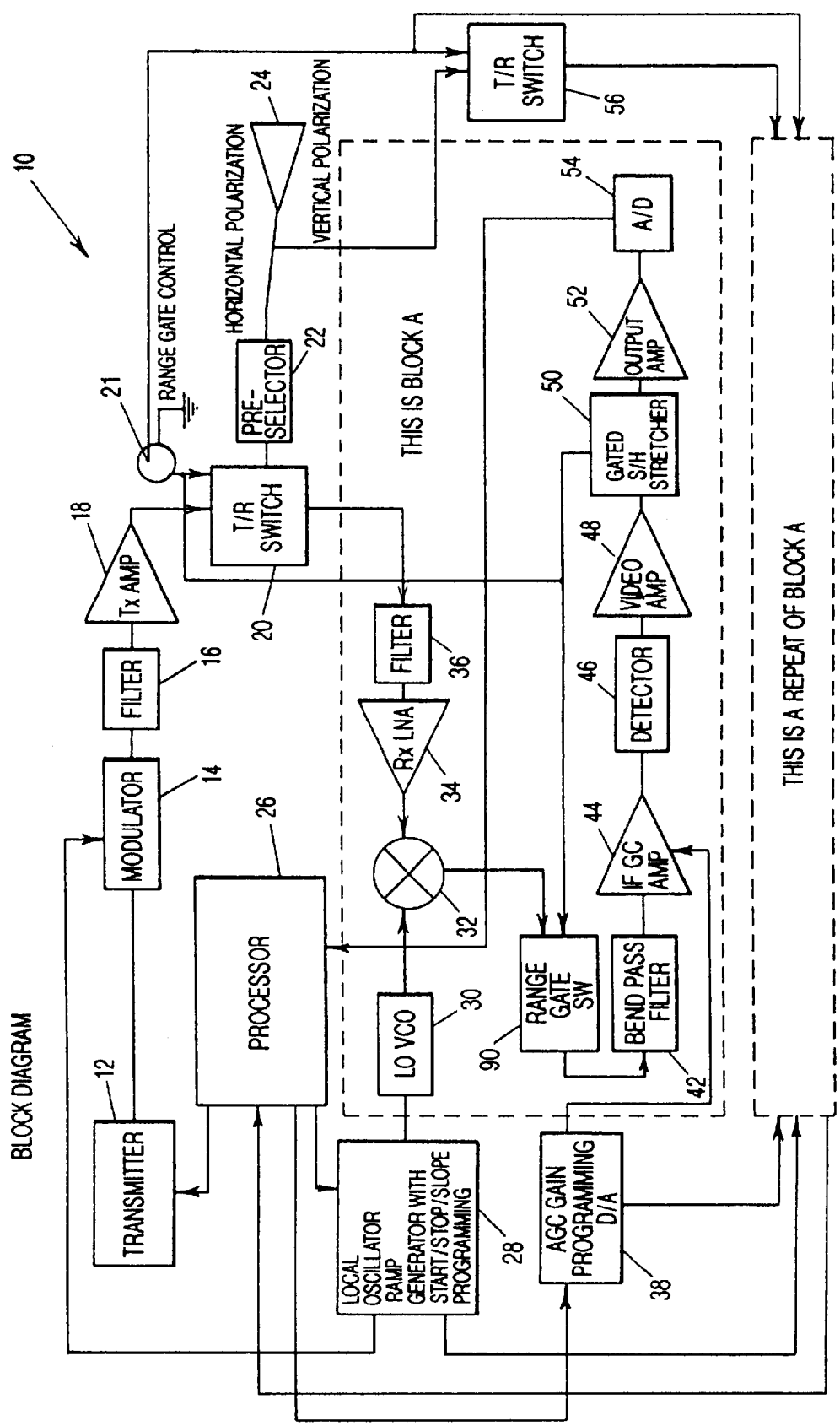

FIG. 3 provides a schematic block diagram of one embodiment of a transmission and detection circuit.

Figure 4:
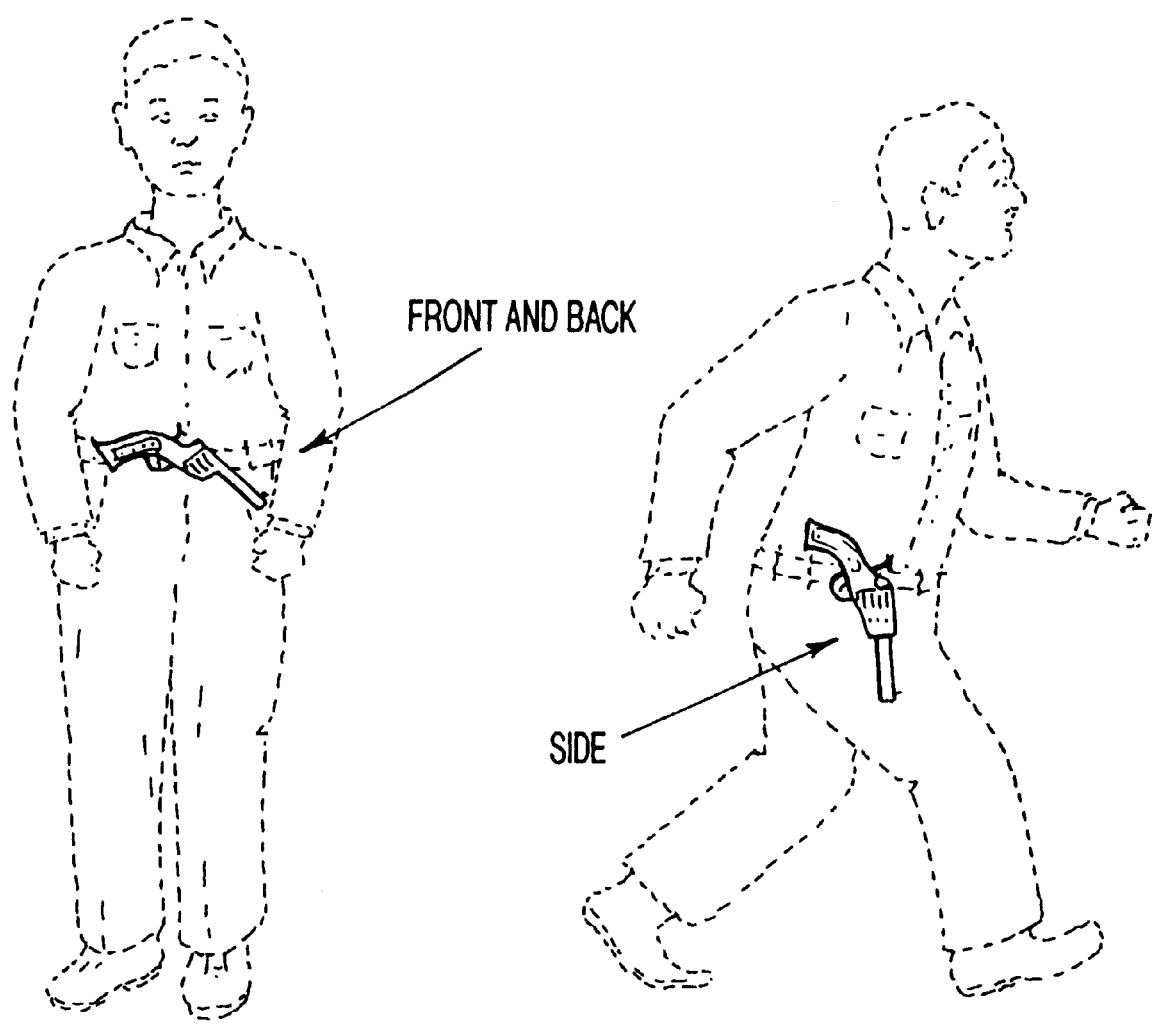

FIG. 4 portrays persons carrying guns in different locations relative to the body.

FIG. 5 is a viewgraph which explains the unit of radiation measurement, dBsm.

FIG. 6 is a chart which provides information concerning the radar cross section of a handgun.

Figure 7A:
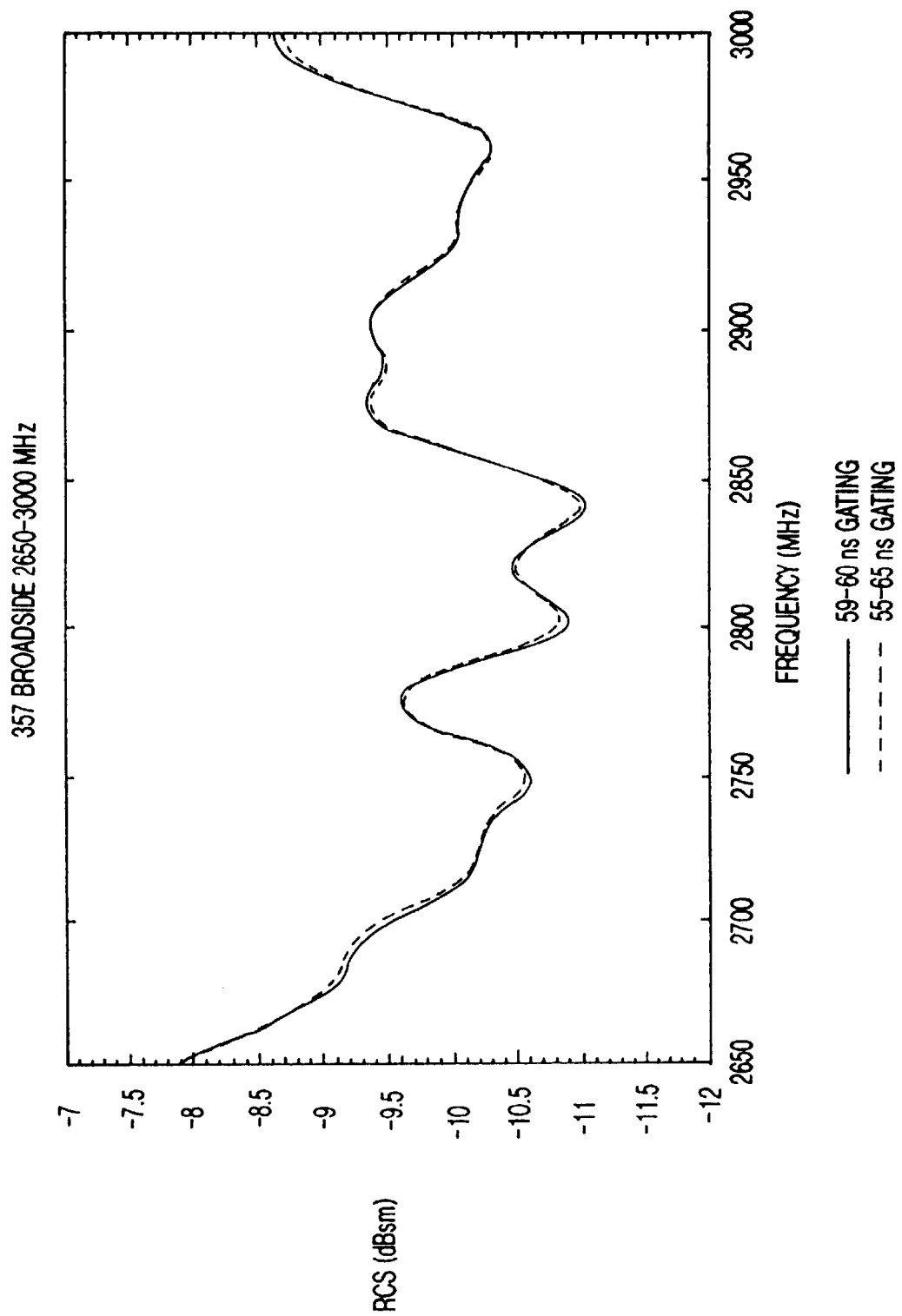
Figure 7B:
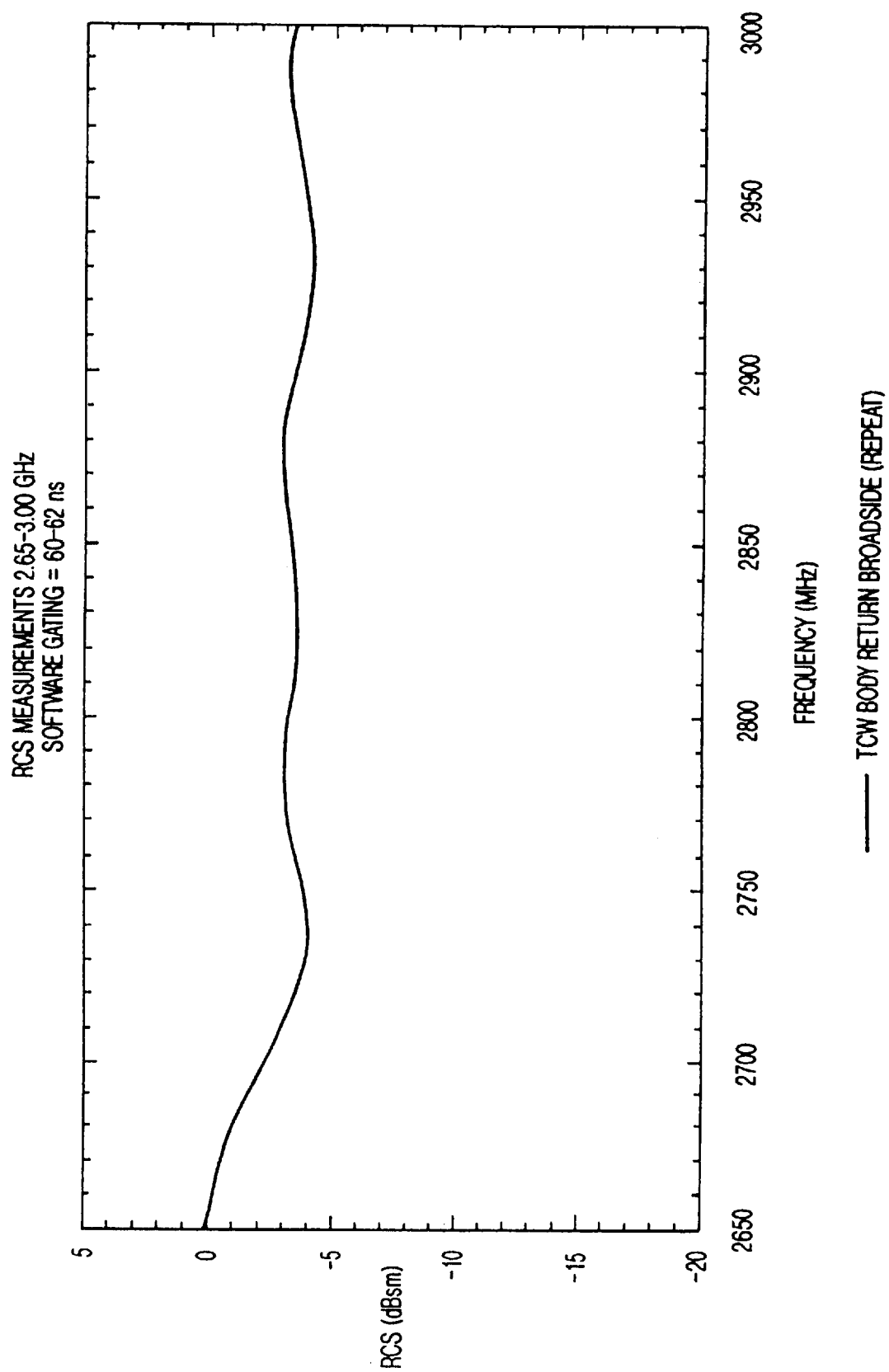

FIG. 7 is a graph showing the radar cross section of a handgun for a particular range of frequencies, plotting reflected energy in dBsm versus frequency.

Figure 8:
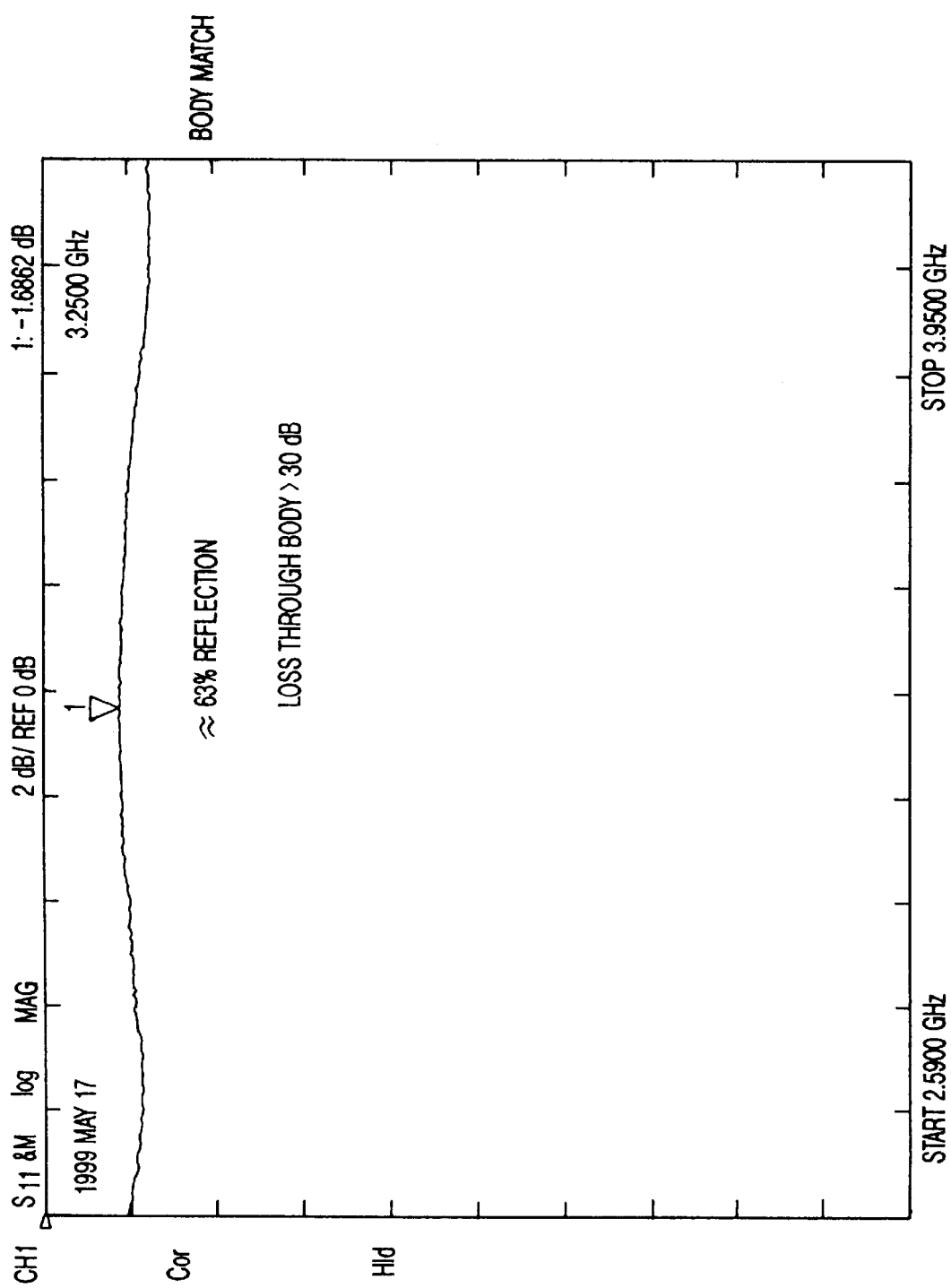
Figure 9:
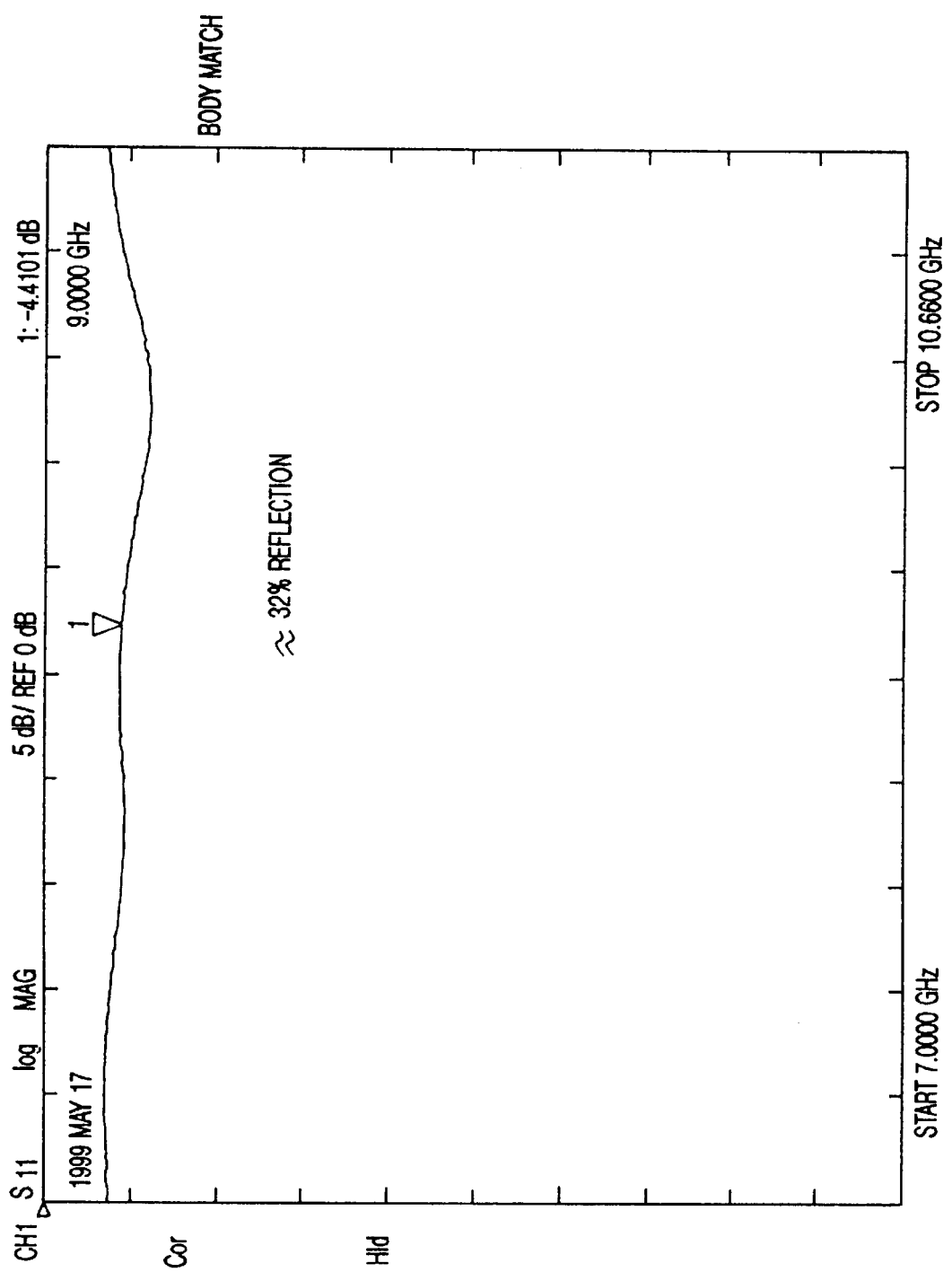

FIGS. 8 and 9 are graphs which supply information concerning the reflectivity of the human body and of a handgun when illuminated with radio waves in the 2.59 to 3.95 GHz and 7.0 to 10.66 frequency bands.

Figure 10:
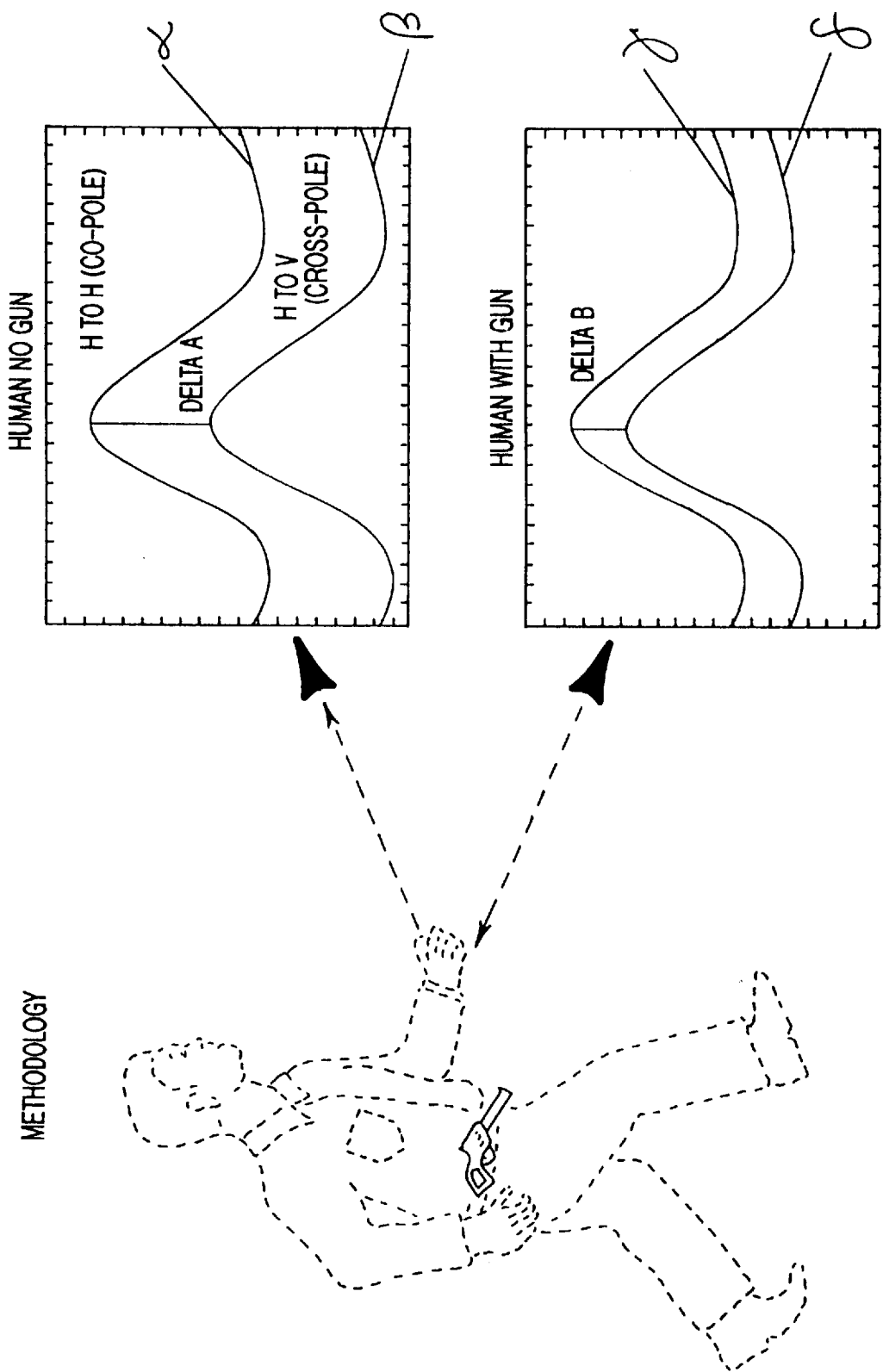

FIG. 10 furnishes a pictorial description of the present invention. The two graphs at the right of the drawing show that an object such as a handgun may be detected by comparing the difference in amplitudes of two sets of waveforms which correspond to reflected radio waves having different polarizations. In both the upper and the lower graphs of FIG. 10, the two waveforms represent the vertically and horizontally polarized radio waves reflected back to the detector. When the person is not carrying a gun, the maximum amplitudes of the waveforms are spread relatively far apart. When the person is carrying a gun, the difference between the maximum amplitudes of the waveforms is substantially decreased.

FIG. 11 is a viewgraph that offers test data regarding the detection of a handgun in accordance with the present invention using the 9.5 to 10.6 GHz frequency bands.

FIG. 12 supplies actual test data concerning the detection of a handgun at the 2.9 to 3.25 GHz frequency band.

Figure 13:
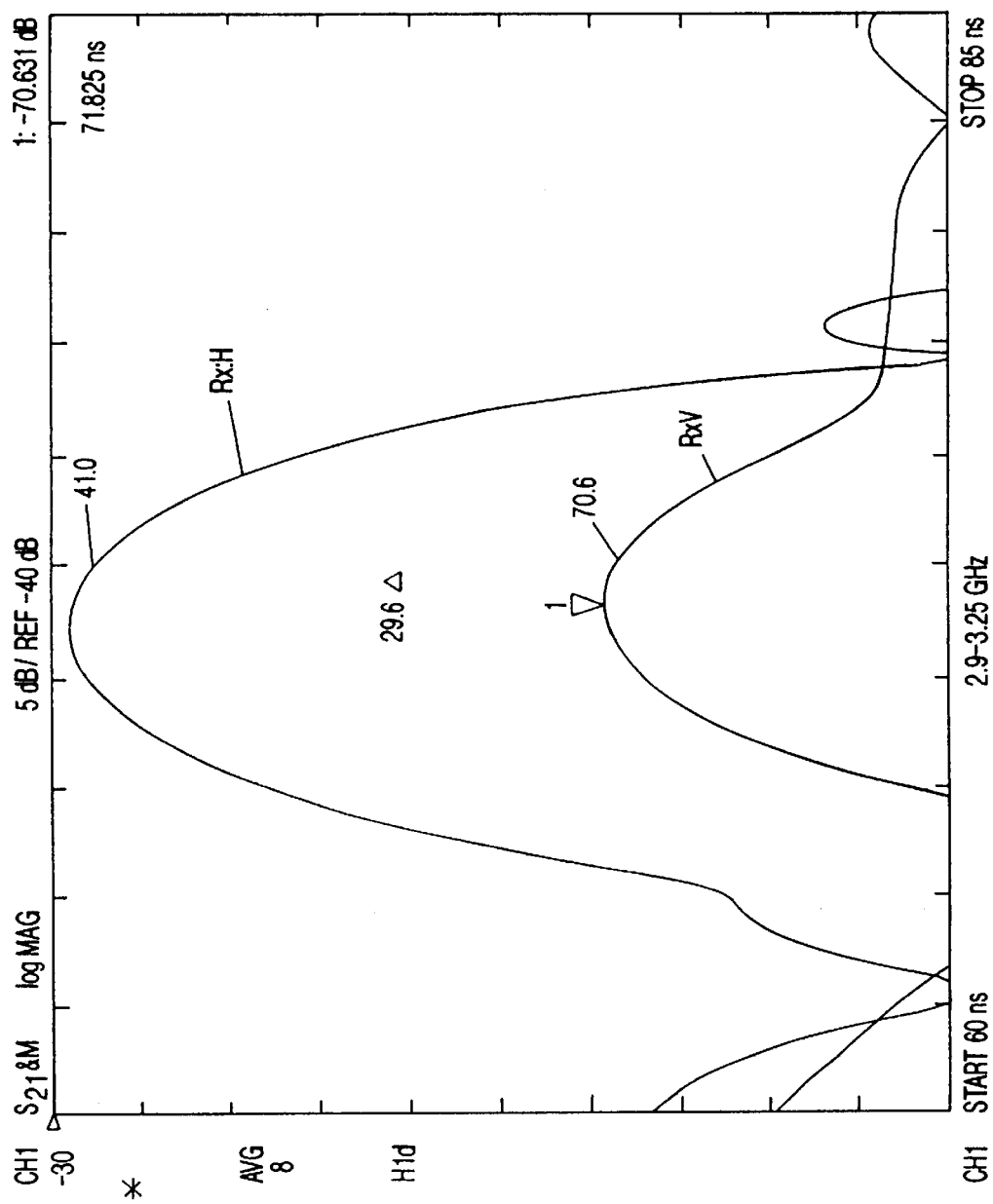
Figure 19:
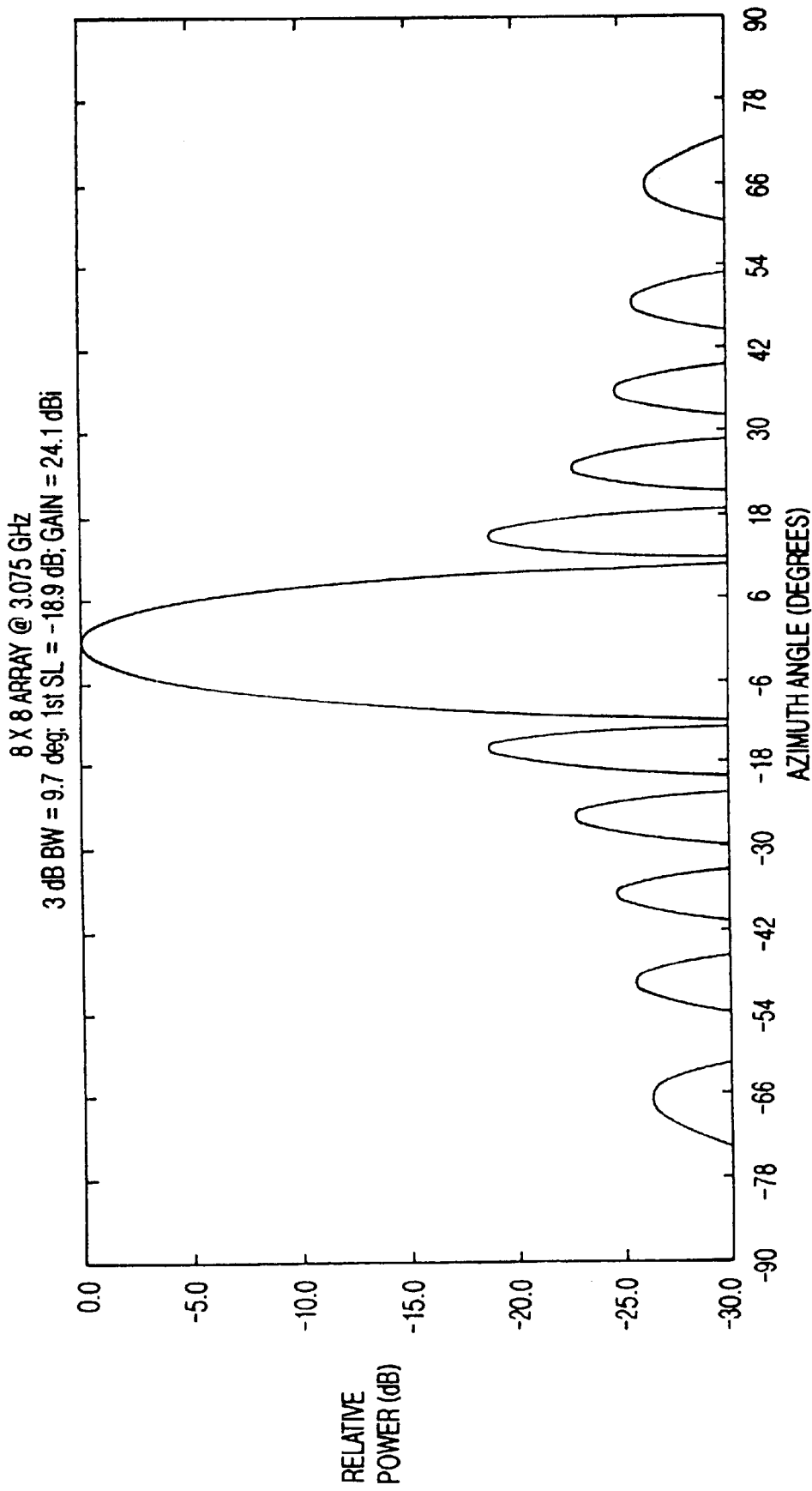
Figure 20:
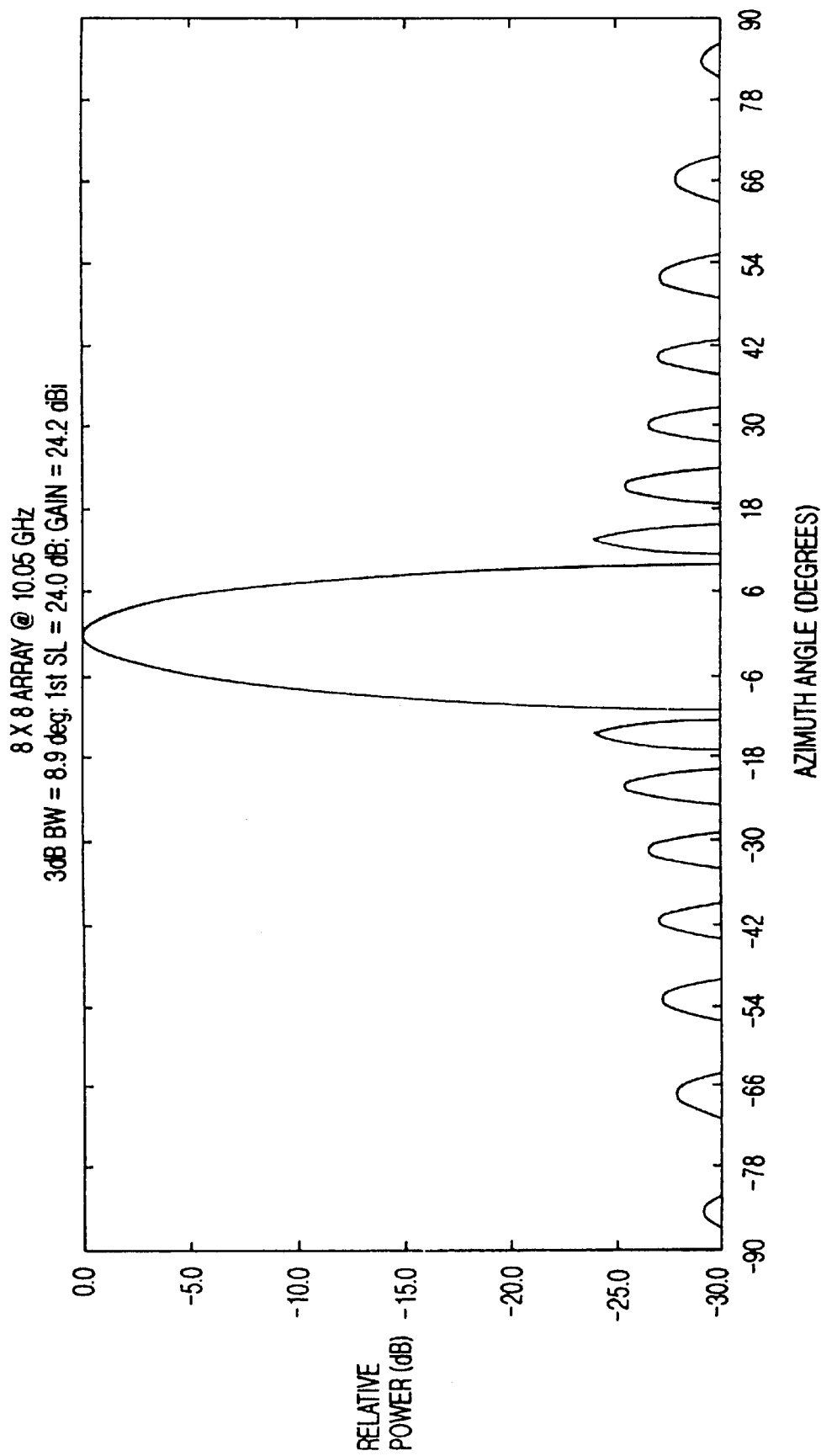

FIGS. 13 and 14 are actual test equipment plots of two pairs of waveforms generated during a handgun detection experiment. In FIG. 13, the person was not carrying a gun, and the maximum values of the two curves are far apart. In FIG. 14, the same person was carrying a handgun, and the distance between the high points of the two curves appears much closer together, correctly indicating the presence of a gun.

FIGS. 15, 16, 17, 18, 19 and 20 exhibit laboratory test data for experiments conducted at two different frequency bands.

FIGS. 21 and 22 provide power versus azimuth angle plots for two 8 by 8 antenna arrays using two different frequency bands.

FIGS. 23 and 24 supply operational parameters for the present invention for two different frequency bands.

Figure 25:
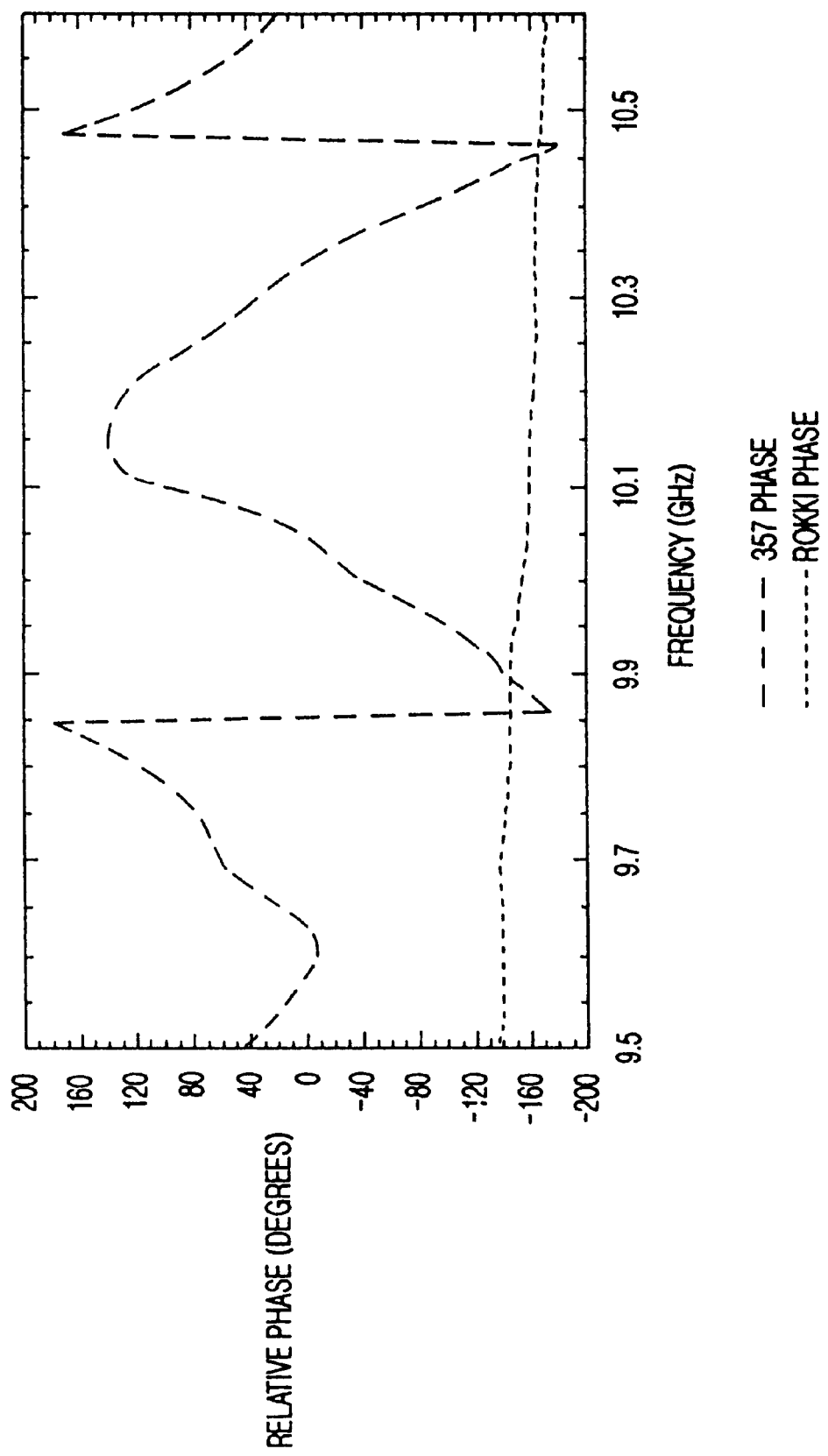
Figure 26:
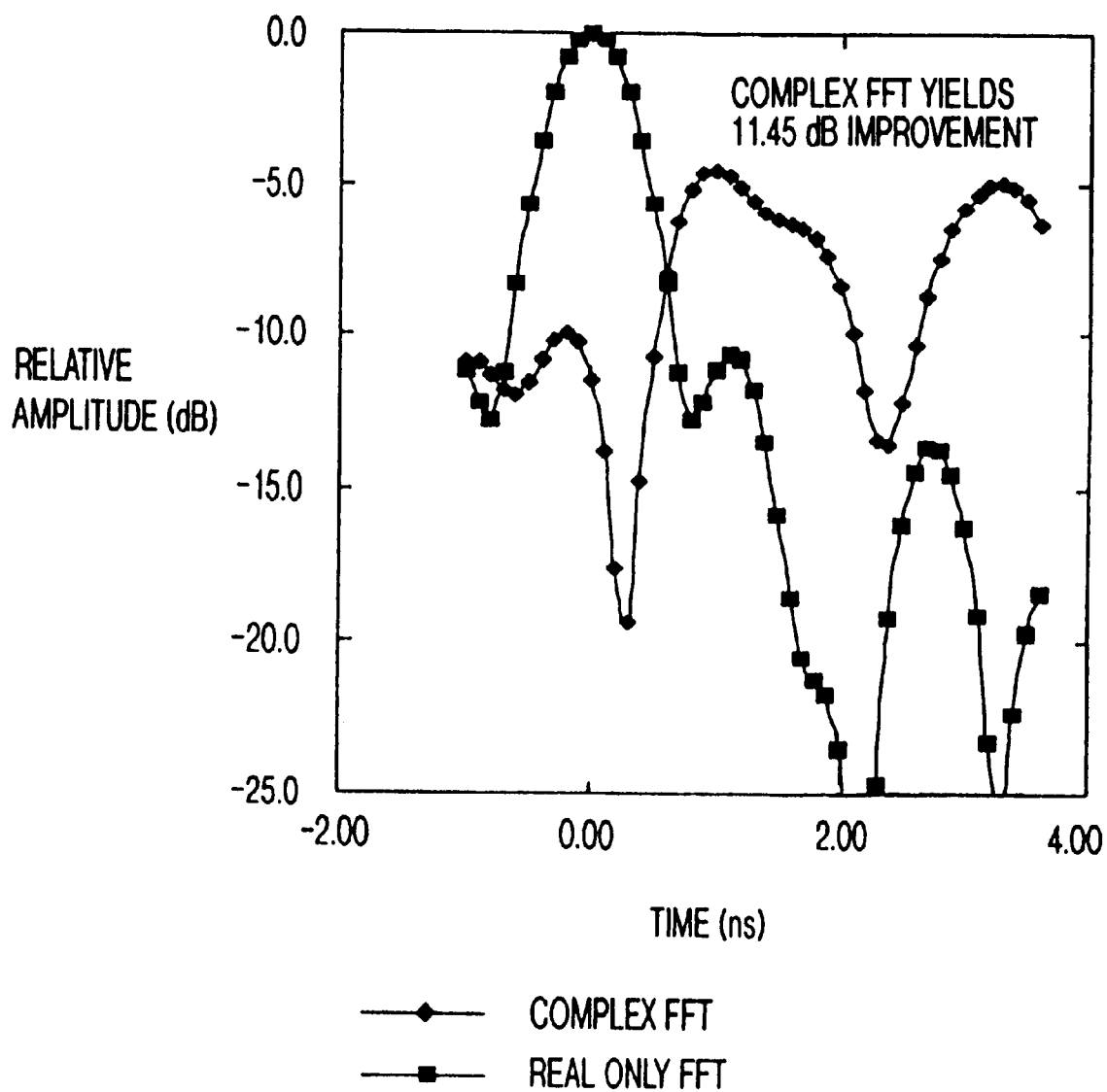

FIGS. 25 and 26 portray a triangular waveform that may be employed in an alternative embodiment of the invention that utilizes a Fast Fourier Transform to improve the reliability of the detector's ability to predict the presence of a weapon.

A DETAILED DESCRIPTION OF PREFERRED & ALTERNATIVE EMBODIMENTS

I. Radio Waves & Polarization

Figure 1A:
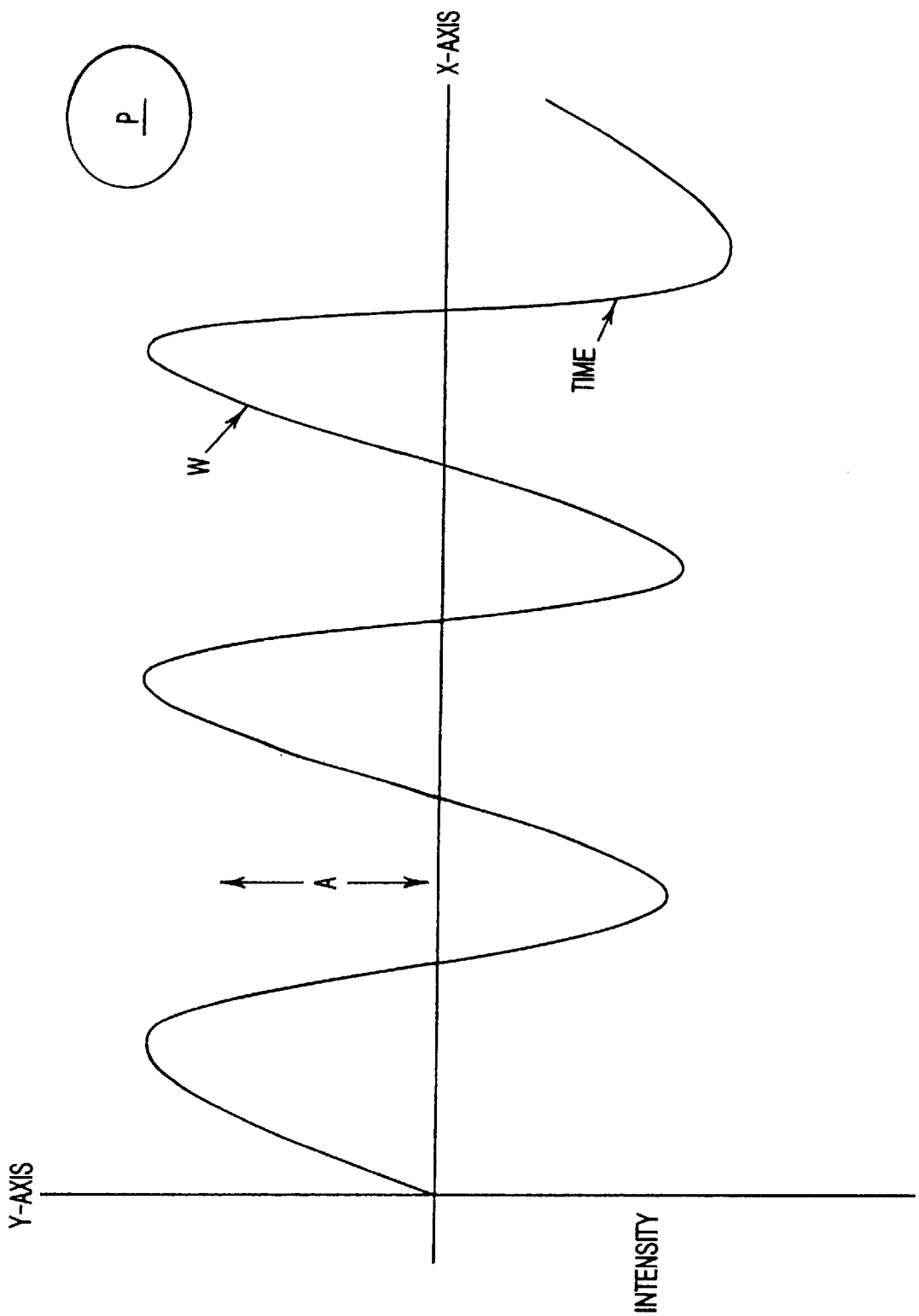
FIG. 1A illustrates a simple wave.

As radio waves travel through the air, they travel in a way similar to waves of water moving across the ocean. The shape of a simple radio wave can be depicted as a repeated up and down movement or vibration, as shown in FIG. 1A. This up and down motion of the wave takes place in a two-dimensional, planar surface like a flat sheet of paper that has height and width. The simple wave (W) travels or propagates only in this plane (P), which is defined by two perpendicular lines or "axes," labeled "x" and "y." These axes serve as scales of measurement. The x-axis provides a measure of time, while the y-axis offers an index for evaluating the intensity of the wave W. None of this simple wave lies outside of the plane P, since all of the vibration occurs on the flat surface defined by the two crossing axes, x and y. The height or intensity of the wave W that extends above the x-axis is also called the amplitude (A) of the wave.

If a wave like the wave in FIG. 1A varies in a plane which is perpendicular to the ground or horizon, it is called a "vertically polarized" wave. Similarly, a wave that varies only in a surface that is parallel to the ground or the local horizon is said to be "horizontally polarized."

Figure 1C:
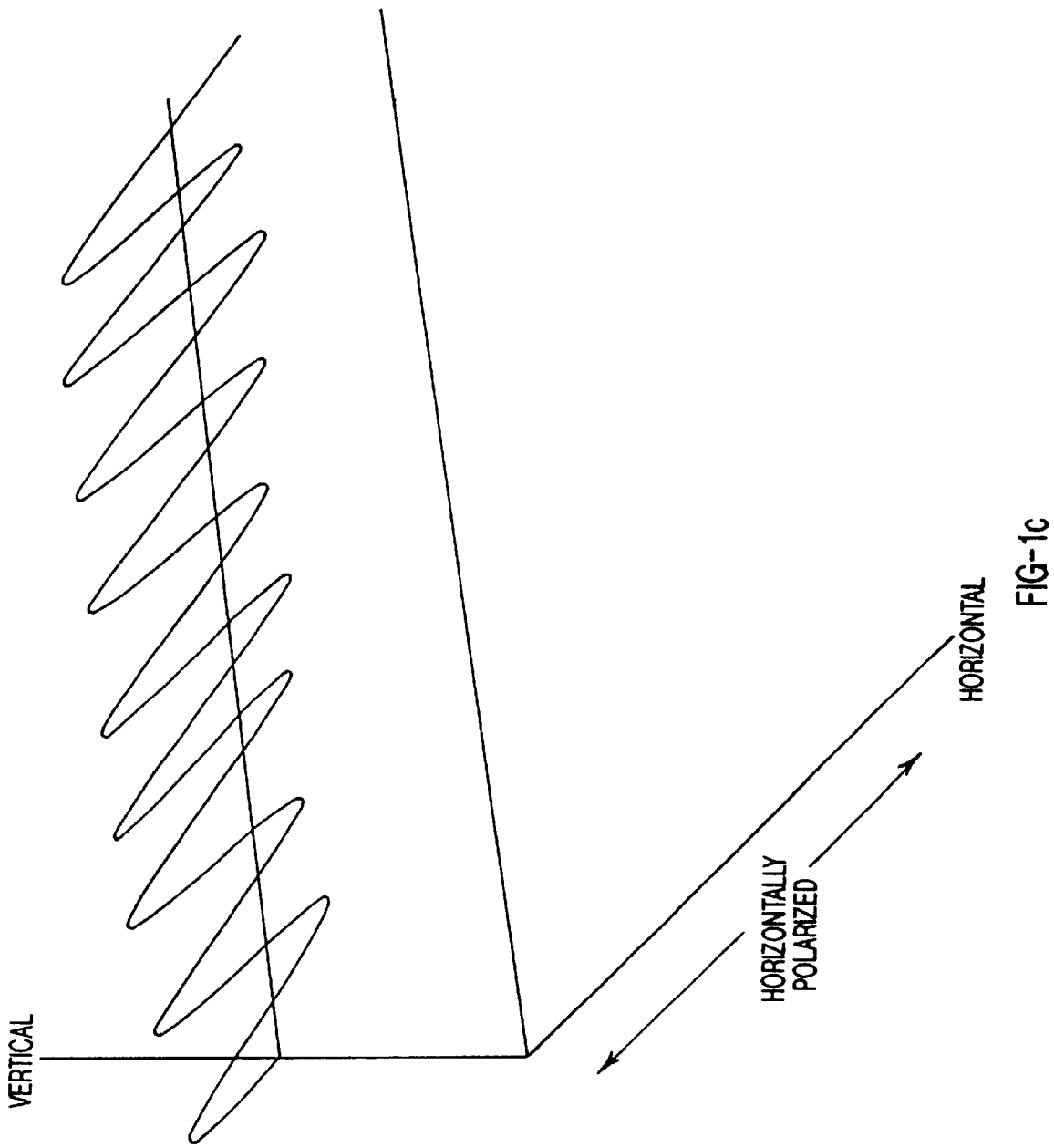
FIG. 1C illustrates a simple wave that is horizontally polarized.

FIG. 1B exhibits a wave which is vertically polarized, while FIG. 1C reveals a wave which is horizontally polarized. Vertical and horizontal polarizations are said to be opposite forms of polarization. Other terms that may be used to describe the relationship between waves that are vertically and horizontally polarized are perpendicular, orthogonal, cross-pole, or main and complementary.

The term "polarization" may be used to describe a wave or a group of waves that are generally confined in a single plane. The idea of polarization is applicable to many forms of waves, whether they are electromagnetic radio waves generated by a transmitter, or light waves emitted by a flashlight.

II. Detection of Objects

FIG. 2 depicts laboratory apparatus that may be used to practice one embodiment of the invention. A low-power radio transmitter coupled to a transmit antenna ($T_x$) is used to illuminate a target inside an anechoic chamber. A receive antenna ($R_x$) collects energy reflected back from the target within the chamber. In a series of experiments conducted to detect persons carrying a handgun in the chamber, a conventional metal .357 caliber pistol is employed. When used in this Specification and in the claims that follow, the term "target" refers to a physical item toward which illuminating radiation is pointed. The target is usually a person. When used in this Specification and in the claims that follow, the term "object" refers to a physical item that is carried on, worn or somehow physically attached, coupled or associated with a target. In one embodiment of the invention, the object that is detected is a concealed weapon.

The power levels radiated by the present invention are much lower than conventional radar systems or than those generated by x-ray or other imaging systems that are currently employed to detect objects at the entry of an airport or a courtroom.

In general, some of the preferred embodiments of the invention operate in the MHz or GHz frequency bands. Different radio frequencies offer different benefits and disadvantages for the object detection provided by the present invention. In the United States, operating frequencies of radio devices are regulated by the Federal Communications Commission. Each country across the globe has similar regulatory bodies which allocate and administer the use of the radio spectrum. Although the description of some embodiments of the invention include specific references to particular frequency ranges, the system may be beneficially implemented using a wide variety of electromagnetic radiation bands.

FIG. 3 presents a schematic block diagram 10 of circuitry that may be used to implement one embodiment of the invention. A transmitter 12 is coupled to a modulator 14, a filter 16, and a transmitter amplifier 18. This amplifier 18 is connected to an antenna horn 24 through a first transmit/receive switch 20 and a pre-selector 22. The transmit/receive switch 20 is also connected to a range gate control 21. A processor 26 is used to control transmitter 12. The output of a local oscillator ramp generator with start/stop/slope programming 28 is connected to modulator 14 and to a local oscillator/voltage control oscillator 30. The output of the local oscillator 30 is fed to a mixer 32. The output of transmit/receive switch 20 is also fed to mixer 32 through a filter 36 and a receive low-noise amplifier 34. An output from the processor 26 is conveyed to an automatic gain control programming digital to analog converter 38. An output from the D/A converter 38 controls an intermediate frequency gain control amplifier 44, which also receives an input from a mixer 32 through range gate switch 40 and band pass filter 42. An output from the IF GC amplifier then passes through detector 46, video amplifier 48, a gated sample and hold stretcher 50, an output amplifier 52 and an analog-to-digital converter 54 before being fed back to processor 26.

FIG. 3 includes a section labeled "Block A" which includes circuit elements 30, 32, 34, 36, 40, 42, 44, 46, 48, 50, 52 and 54. This block is duplicated in the circuit, but is shown as a second rectangle drawn in dashed line at the bottom of the figure. This lower rectangle is labeled with the legend "This is a repeat of Block A" and with the reference character 58. The left side of this repeated Block A 58 is shown connected to the AGC gain programming D/A converter 38, the local oscillator 28, and to processor 26. The right side of this repeated Block A 58 is shown connected to the range gate control 21, and to a second transmit/receive switch 56.

FIG. 4 is a pictorial rendition of two persons carrying handguns. On the left side of the figure, a person is shown with a gun held in place either in front or in back of a belt. On the right side of the figure, another person is shown with a gun carried in a bag or pouch situated on the hip at the person's side. Different methods, which are described below, are employed to detect objects or weapons that are concealed in various places on the body.

FIG. 5 is a chart which explains a unit of measurement, "dBsm," that is used to quantify reflected radiation. The dBsm is based on a unit of measurement called the decibel, named after Alexander Graham Bell, and is abbreviated "dB." Decibels are used to compare two levels of radiated or reflected power. As an example, if a person listening to a radio is very close to the antenna tower of a radio station, the power level that would be very high. If the same person were many miles away from the same antenna tower, the strength of the received radio waves would be much lower because of the increased distance. Decibels could be used to quantify this difference in power levels as a single number. Unlike common fractions, which are simply one number divided by another number, decibels are a logarithmic form of measurement, which is highly useful since they are used to compare very large differences in numbers. Since radiated power levels can vary over such large ranges, a logarithmic scale is used instead of a more common linear scale. Decibels are calculated as follows:

$$dB = 10 \log P_x/P_y$$

where $P_x$ is a first power level, and $P_y$ is a second power level. When the two received radio signals are compared using decibels, the reduction in the power of the signal that is received at the greater distance is said to be a certain number of decibels lower than the power level at the closer location.

A decibel per square meter or "dBsm" is a measurement of reflected power compared to a known transmitted power for a known area which is illuminated with the same transmitted power. For example, if a flashlight is used to shine a beam of light towards a square mirror in a darkened room, a certain amount of light will be reflected back toward the flashlight. If the same flashlight is used to shine light on a mirror twice as large, twice the amount of light will be bounced back toward the flashlight. The unit "dBsm" is used to account for the amount of energy reflected back from an illuminated target, since it is reduced or normalized by the size of the target measured in square meters. When dBsm units are used, the reduction in power level from two different sized but similarly reflecting targets which are illuminated with the same radiation is the same.

FIG. 5 reveals "dBsm" levels for test objects which are placed in an anechoic chamber and then illuminated with radio waves at various frequency bands. These test plates are used to calibrate the equipment that is used for object detection.

FIG. 6 supplies information concerning a term of measurement called "radar cross section." When radio waves are generated and then directed toward an object, some portion of those transmitted waves pass through the object, another portion of those waves are absorbed by the target, and a third portion of the transmitted waves are reflected back toward the transmitter. The larger the portion of reflected waves, the greater the radar cross section of an object. An object that has a relatively large radar cross section is therefore relatively easier to detect, compared to an object that has a smaller radar cross section. The magnitude of the measured radar cross section of an object depends largely on its reflectivity, and on the spatial orientation of the object to the direction of the transmitted radio wave. For example, suppose a radar station on the shoreline is looking for ships at sea nearby. Ships which are traveling parallel to the coastline are easier to detect than a similar vessel that is sailing away from land, since the radar waves that hit the first ship broadside bounce back to the radar station with greater intensity than those which only reflect off of the smaller stern of the boat that is bound straight out to the ocean. The boat which is oriented "sideways" to the direction of travel of the radar waves has a larger radar cross section than the boat which presents a smaller target to the radar waves.

When the present invention is used to detect an object like a handgun, the detection is more easily accomplished when the handgun is oriented in a way that presents a relatively larger radar cross section to the detector. For example, a gun that is tucked behind a person's belt buckle so that the side of the gun is flat against the waist presents a larger radar cross section than a weapon holstered on the hip with the gun barrel pointing toward the ground and the grip pointing forward or back.

The data in FIG. 6 pertains to the radar cross section of a conventional metal .357 caliber handgun illuminated a several different frequency bands. These data were established to calibrate the detector equipment and to provide reference measurements. Similarly, FIG. 7 provides data regarding the radar cross section (RCS) of a .357 caliber pistol for transmitted radiation spanning the 2650 to 3000 MHz frequency range. The curve shows that for a gun oriented in the broadside position, meaning that the longest dimension of the gun extends sideways to the direction of the transmitted radio wave, the radar cross section (RCS) measured in dBsm varies from about –8 dBsm to –11 dBsm over this frequency range.

FIGS. 8 and 9 provide measurements of the reflection of radio waves of a person in the test chamber. FIG. 8 contains empirical data that indicates that when a person is illuminated with radiation, about 63% of the radio wave energy is reflected back from the body between 2.59 to 3.95 GHz. FIG. 9 shows that about 32% is reflected back between 7.0 to 10.66 GHz. This information was gathered using radio waves transmitted at the 2.59 to 3.95 and the 7.0 to 10.66 GHz bands.

FIG. 10 exhibits the fundamental mode of operation of one embodiment of the present invention. Persons entering a protected space or "Safe Zone™" are illuminated with radio waves which are horizontally polarized. Some of these radio waves are absorbed, while some are reflected back toward the transmitter. When the transmitter illuminates a person without a gun, the two curves in the upper graph in FIG. 10 are produced. These two curves represent the amplitude of the horizontally polarized energy reflected back to the detector (the upper curve), and the amplitude of the vertically polarized energy reflected to the detector (the lower curve). The gap, labeled "Delta A," between the maximum amplitudes of these two curves is relatively wide compared to the gap between the maximum amplitudes of the two curves in the graph in the lower right portion of FIG. 10.

The lower graph shown in FIG. 10 contains two curves produced when a person is carrying a handgun that is sensed by the detector. The gap between the curves, labeled "Delta B," is substantially narrower than the gap in the upper graph. As in the upper graph, the two curves represent the energy level of horizontally polarized radio waves reflected from the person (the upper curve), and the energy level of vertically polarized radio waves reflected back from the person (the lower curve). In general, when the person has a gun, or any other object that presents a substantial reflective presence that is oriented perpendicular to the direction of travel of the incident radio waves, the component of vertically polarized energy which is reflected back from the object increases.

In a controlled or laboratory environment, one algorithm that is used to detect an object such as a concealed weapon may be formulated as follows:

If $((\alpha-\beta)-(\gamma-\delta))$ is greater than a predetermined constant, then an object which presents a sensible cross-section that is generally orthogonal to the direction of travel of the incident horizontally polarized radiation, and which reflects some vertically polarized radiation, is present.

where
- $\alpha$ is the maximum amplitude of the waveform in FIG. 10 marked "$\alpha$" representing the expected horizontally polarized radiation that would be reflected back from a person who is not carrying a firearm;
- $\beta$ is the maximum amplitude of the waveform in FIG. 10 marked "$\gamma$" representing the expected vertically polarized radiation that would be reflected back from a person not carrying a firearm;
- $\gamma$ is the maximum amplitude of the waveform in FIG. 10 marked "$\gamma$" representing the horizontally polarized radiation reflected back from a person carrying a firearm; and
- $\delta$ is the maximum amplitude of the waveform in FIG. 10 marked "$\delta$" representing the vertically polarized radiation reflected back from a person carrying a firearm.

In general, the present invention relies on the physical phenomenon of reflection in which an incident beam of horizontally polarized radiation will be reflected back as vertically polarized radiation if the object which the incident beam impinges upon is oriented in such a way that it presents a substantial orthogonal cross-section to the direction of travel of the incident beam. The greater the cross-section of the object that is parallel with the local horizon, the greater the likelihood of detection will be using this particular method. The opposite is also an effective method of detection—a transmitted outbound beam of vertically polarized radiation will be cause horizontally polarized reflections if the outbound beam strikes an object which presents a substantial cross-section that is aligned vertically to the local horizon. In this Specification and in the claims that follow, the terms "vertical" and "horizontal" are relative, and are used in an approximate sense. The invention does not require perfect transmission or reception of vertical and horizontal waves. Signals which are generally aligned in the vertical or in the horizontal planes, within a reasonable margin of misalignment, are capable of producing reliable detection results.

Outside the laboratory, the invention is capable of being implemented using a standard set of stored values that represent the signals which are reflected from persons who are not carrying concealed weapons. This data, which may be measured and compiled using a large number of persons, would furnish the information represented in the upper graph shown in FIG. 10. In an advanced implementation of the invention, the detector is capable of adapting to its environment by progressively and continuously learning about the reflected signals that are produced by many persons entering the "Safe Zone™" who are not carrying weapons.

III. Laboratory Data

FIG. 11 is a viewgraph that offers test data regarding the detection of a handgun in accordance with the present invention using the 9.5 to 10.6 GHz frequency bands. FIG. 12 supplies actual test data concerning the detection of a handgun at the 2.9 to 3.25 GHz frequency band.

FIGS. 13 and 14 are actual test equipment plots of two pairs of waveforms generated during a handgun detection experiment. In FIG. 13, the person was not carrying a gun, and the maximum values of the two curves are far apart. In FIG. 14, the same person was carrying a handgun, and the distance between the high points of the two curves appears much closer together, correctly indicating the presence of a gun.

FIGS. 15, 16, 17, 18, 19 and 20 exhibit laboratory test data for experiments conducted at two different frequency bands. FIGS. 21 and 22 provide power versus azimuth angle plots for two 8 by 8 antenna arrays using two different frequency bands. FIGS. 23 and 24 supply operational parameters for the present invention for two different frequency bands.

IV. Improving Reliability

In general, the present invention may be used to detect objects by illuminating a target with polarized radiation, and then sensing a cross-polarized reflection of said object. Unfortunately, persons entering a "Safe Zone™" such as the lobby of a bank building may carry many items such as car keys, cell phones, pagers or notebooks with spiral wire binders that may also cause substantial reflections. Other items such as metal eyeglass frames, jewelry, zippers or belt buckles may also produce substantial levels of reflected energy. If the primary use of the invention is the detection of a concealed weapon, it is important to distinguish the signals generated by these extraneous items from those generated by the weapon. In an advanced embodiment of the invention, novel signal processing methods are employed to distinguish reflections from weapons from reflections from these extraneous items. In one embodiment of the invention, a mathematical method using a Fast Fourier Transform, which converts information in the frequency domain to information in the time domain or vice-versa, is used to enhance the ability of the invention to detect a weapon. In general, this signal processing method identifies and discounts the patterns of reflected energy that are constantly changing in an erratic fashion.

FIGS. 25 and 26 portray a triangular waveform that may be employed in an alternative embodiment of the invention that utilizes a Fast Fourier Transform to improve the reliability of the detector's ability to predict the presence of a weapon.

V. Alternative Embodiments & Applications

Although a preferred embodiment of the invention has been described in the context of detecting concealed handguns, the present invention may be employed to detect any number of objects. Since most knives have cross-pieces immediately below the blade, the invention may also be used to sense knives. The system may also be employed as a bomb or explosive detection device.

One embodiment of the present invention offers the additional benefits of being lightweight, portable and battery-operated. One version of the system may be constructed as a hand-carried unit that could be used by law enforcement officers during traffic stops to determine if the occupant of an automobile is armed. The invention may also be incorporated into automatic door-opening equipment.

The invention is not limited to finding weapons. In an alternative embodiment, the invention may locate distinctly shaped merchandise, or inexpensive tags attached to merchandise as an inventory control and anti-shoplifting system.

CONCLUSION

Although the present invention has been described in detail with reference to a particular preferred and alternative embodiments of the invention, persons possessing ordinary skill in the art to which this invention pertains will appreciate that various modifications and enhancements may be made without departing from the spirit and scope of the claims that follow. The circuit components that have been disclosed above are intended to educate the reader about particular preferred and alternative embodiments, and are not intended to constrain the limits of the invention or the scope of the claims. Although the preferred embodiments have been described with particular emphasis on specific hardware configurations or frequency bands, the present invention may be implemented using a variety of circuit components or frequency ranges.

LIST OF REFERENCE CHARACTERS

10 Schematic block diagram of one embodiment of the invention
12 Transmitter
14 Modulator
16 Filter
18 Transmit amplifier
20 Transmit/receive switch
21 Range gate control
22 Polarization pre-selector
24 Antenna
26 Processor
28 Local oscillator/Ramp generator with start/stop/slope programming
30 Local oscillator/Voltage controlled oscillator
32 Mixer
34 Receiver/Low noise amplifier
36 Filter
38 Automatic gain control/Gain programming digital-to-analog converter
40 Range gate switch
42 Band pass filter
44 Intermediate frequency, gain control amplifier
46 Detector
48 Video amplifier
50 Gated sample and hold stretcher
52 Output amplifier
54 Analog-to-digital converter
56 Transmit/receive switch
58 Repeat of Block A

What is claimed is:

1. A method of detecting an object comprising the steps of:
   illuminating a target with polarized radiation;
   collecting first radiation reflected from said target which has a polarization which is the same as the radiation used to illuminate said target;
   collecting second radiation reflected from said target which is oppositely polarized to that of said radiation which is used to illuminate said target; and
   comparing a difference between amplitudes of said first and second radiation with a predetermined value representative of an expected difference when the object were not present.

2. A method as recited in claim 1, in which said polarized radiation that is used to illuminate said target is horizontally polarized.

3. A method as recited in claim 1, in which said reflected radiation that is used to illuminate said target is vertically polarized.

4. A method as recited in claim 1, in which said target is a person.

5. A method as recited in claim 4, in which said object is a concealed weapon.

6. A method as recited in claim 5, in which said concealed weapon is a firearm.

7. A method as recited in claim 1, in which said target is illuminated with radio waves.

8. A method as recited in claim 1, further comprising the step of:
   using a Fast Fourier Transform to substantially discount the moving components of said target to improve the detection of unchanging components of said target.

9. A method of detecting an object comprising the steps of:
   solving the equation $((\alpha-\beta)-(\gamma-\delta))=X$;
   where
   $\alpha$ is the maximum amplitude of a waveform representing the expected horizontally polarized radiation that would be reflected back from a person who is not carrying a firearm;
   $\beta$ is the maximum amplitude of a waveform representing the expected vertically polarized radiation that would be reflected from a person not carrying a firearm;
   $\gamma$ is the maximum amplitude of a waveform representing the horizontally polarized radiation reflected back from a person carrying a firearm; and
   $\delta$ is the maximum amplitude of a waveform representing the vertically polarized radiation reflected back from a person carrying a firearm; and
   determining that a firearm is present if X exceeds a predetermined constant.

* * * * *